(12) United States Patent
Sacle et al.

(10) Patent No.: US 9,188,978 B2
(45) Date of Patent: Nov. 17, 2015

(54) METHOD FOR AIDING NAVIGATION FOR AN AIRCRAFT DURING DESCENT AND DURING APPROACH AT REDUCED THRUST

(71) Applicant: THALES, Neuilly-sur-Seine (FR)

(72) Inventors: Jerome Sacle, Valence (FR); Johan Boyer, Valence (FR); Francois Coulmeau, Valence (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/522,469

(22) Filed: Oct. 23, 2014

(65) Prior Publication Data

US 2015/0120100 A1  Apr. 30, 2015

(30) Foreign Application Priority Data

Oct. 25, 2013  (FR) ..................................... 13 02471

(51) Int. Cl.
*G05D 1/00* (2006.01)
*G05D 1/04* (2006.01)
*G08G 5/00* (2006.01)
*G01C 21/20* (2006.01)
(Continued)

(52) U.S. Cl.
CPC ........ *G05D 1/00* (2013.01); *G01C 21/20* (2013.01); *G05D 1/0005* (2013.01); *G05D 1/042* (2013.01); *G05D 1/0676* (2013.01); *G06Q 10/047* (2013.01); *G08G 5/003* (2013.01); *G08G 5/006* (2013.01); *G08G 5/0095* (2013.01); *G08G 5/025* (2013.01)

(58) Field of Classification Search
CPC ... G01C 21/20; G05D 1/0005; G05D 1/0676; G05D 1/042; G06Q 10/047; G08G 5/006; G08G 5/023; G08G 5/025; G08G 5/003; G08G 5/0095

USPC ............................................................ 701/18
See application file for complete search history.

(56) References Cited

U.S. PATENT DOCUMENTS

2012/0277936 A1 * 11/2012 Kumar MN et al. ............ 701/16

FOREIGN PATENT DOCUMENTS

EP       2362289 A2    8/2011

OTHER PUBLICATIONS

Shih-Yih (Ryan) Young, et al., "Optimal Profile Secent with 4-D Trajectory", Integrated Communications, Navigation and Surveillance Conference (ICNS), Apr. 22, 2013, pp. 1-15, IEEE, XP032432018.

(Continued)

*Primary Examiner* — Mary Cheung
*Assistant Examiner* — Yuen Wong
(74) *Attorney, Agent, or Firm* — Baker & Hostetler LLP

(57) ABSTRACT

A method for aiding navigation for an aircraft between a descent start point and a computation end point, comprises the computation steps of: collecting a flight plan consisting of a succession of waypoints and of the associated vertical constraints; determining a corridor consisting of a floor trajectory and of a ceiling trajectory defining the minimum and maximum altitudes permitted to the aircraft; splitting the corridor into several cells defined between two waypoints furthest apart and between which the ceiling trajectory is distinct from the floor trajectory; determining for at least one cell a vertical trajectory complying with the altitude constraints and comprising the longest possible IDLE segment; and a step consisting in determining and displaying maneuvering points of the aircraft making it possible to follow the target vertical trajectory.

15 Claims, 21 Drawing Sheets

(51) Int. Cl.
*G05D 1/06* (2006.01)
*G06Q 10/04* (2012.01)
*G08G 5/02* (2006.01)

(56) References Cited

OTHER PUBLICATIONS

Michael Lamarr, et al., "Enhancing Pilot Ability to Perform CDA with Descriptive Waypoints", Digital Avionics Systems Conference (DASC), Oct. 16, 2011, pp. 1-25, IEEE, XP032069564.

Richard A Coppenbarger, et al., "Field Evaluation of the Tailored Arrivals Concept for Datalink-Enhabled Continuous Descent Approach", 7th AIAA Aviation Technology, Integration nd Operations Conference, Sep. 18-20, 2007, pp. 1-14, XP008123568.

Laurel L. Stell, "Predictability of Top of Descent Location for Operational Idle-Thrust Descents", 10th AIAA Aviation Technology Integration and Operations Conference, Sep. 13, 2010, pp. 1-12, XP055127574.

* cited by examiner

METHOD FOR AIDING NAVIGATION FOR AN AIRCRAFT DURING DESCENT AND DURING APPROACH AT REDUCED THRUST

CROSS-REFERENCE TO RELATED APPLICATION

This application claims priority to foreign French patent application No. FR 1302471, filed on Oct. 25, 2013, the disclosure of which is incorporated by reference in its entirety.

FIELD OF THE INVENTION

The invention relates to a method of aircraft vertical trajectory construction, and more particularly to a vertical trajectory construction method intended to optimize the maneuvers of an aircraft in a phase of descent and approach to the runway of the arrival airport.

BACKGROUND

Terminal procedures, covering the takeoff and landing phases, form the subject of research aimed at decreasing environmental nuisance, in particular noise or emissions of pollutant or greenhouse effect gases. The approach procedures customarily implemented generally comprise an alternating series of descent segments and of plateaus of constant altitude. Such an approach procedure is shown diagrammatically in FIG. 1 by the trajectory referenced 10. The plateaus 11 carried out at constant altitude allow the air traffic control to monitor and separate the aircraft from the relief or from other aircraft. They also make it possible to perform diverse maneuvers, such as reduce the aircraft speed or modify its aerodynamic configuration (deploy the slats, the flaps, the airbrakes) while safeguarding passenger comfort.

Alternative procedures to this plateau-based approach are envisaged. CDA procedures, the acronym standing for Continuous Descent Approach, are known for example, their aim being to descend towards the landing runway while maintaining reduced thrust so as to minimize nuisance (noise and pollution). Accordingly, it is sought to maintain the aircraft under reduced thrust, or IDLE thrust regime according to the terminology of the art, for as long as possible, between a descent start point and an exit point beyond which the reduced thrust can no longer be upheld in order to allow the aircraft to land. A CDA procedure without vertical constraint, or CDA-SCV, is represented by the trajectory 12 in FIG. 1. The aircraft is maintained under reduced thrust on this trajectory for as long as possible, and without any constant altitude plateau. A CDA procedure with vertical constraint, or CDA-PVC, is represented by the trajectory 13. In this case, the descent is also carried out under idle regime but also takes account of possible vertical constraints, in terms of altitude and/or speed at one or more intermediate points between the descent start point and the exit point.

Procedures referred to as "green" in the terminology of the art, for which the reduced-thrust descent procedures make it possible to reduce the emissions of pollutants and of greenhouse effect gases, are also known. By maintaining the idle regime for as long as possible, fuel consumption is reduced accordingly, as are airline operating costs. These reduced-thrust descent procedures and their implementations are explained in detail hereinafter.

FMS Systems of the Prior Art

Diverse systems exist for aiding a crew in the piloting of an aircraft notably during an approach phase. Known in particular among these systems are flight management systems (FMS), shown diagrammatically in FIG. 2 and comprising the following functions:

Location LOCNAV, labelled 1: making it possible to locate the aircraft by means of diverse geolocation tools or instruments (GPS, GALILEO, VHF radio beacons, inertial platforms), Flight plan FPLN, labelled 2: making it possible to input the geographical elements constituting the skeleton of the route to be followed (departure and arrival procedures, waypoints, etc.), Navigation database NAVDB 3: making it possible to construct geographical routes and procedures on the basis of data included in the bases (points, beacons, interception or altitude legs, etc.), Performance database PRF DB 4: containing the craft's aerodynamic and engine parameters, Lateral trajectory TRAJ 5: making it possible to construct a continuous trajectory on the basis of the points of the flight plan, complying with the aeroplane performance and the confinement constraints, Predictions PRED 6: making it possible to construct an optimized vertical profile compatible with the lateral trajectory, Guidance GUIDANCE 7: making it possible to guide the aircraft on its 3D trajectory in the lateral and vertical planes, while optimizing the speed, Digital datalink DATALINK 8: making it possible to communicate with control centres, airlines and other aircraft.

Flight Plan & Vertical Constraints

A flight plan defined by the pilot comprises a list of waypoints characterized notably by lateral and vertical geographical coordinates, speed constraints and/or transit time constraints. FIG. 3 illustrates a conventional flight plan of an aircraft 20 proceeding towards a landing runway at a landing point 21, and comprising a sequence of waypoints WPTi. On the basis of these waypoints, the FMS determines a target trajectory for the aircraft, consisting of a series of segments 22 connecting two successive waypoints. The trajectory is generally split between a lateral trajectory, determined by the TRAJ function 5, and a vertical trajectory, determined by means of the PRED function 6. In FIG. 3 is represented the lateral trajectory, referenced PP.

The constraints in terms of altitude, speed or waypoints transit time can be expressed in diverse ways. The following are known in particular:

altitude constraints, for example of the "AT" (transit the point at the given altitude), "AT OR ABOVE" (transit at or above the given altitude), "AT OR BELOW" (transit at or below the altitude) or "WINDOW" (transit between two altitudes) type, speed constraints, for example of "AT" (transit the point at the given speed), "AT OR FASTER" (transit at or above the given speed), "AT OR LESS" (transit at or below the speed) or "WINDOW" (transit between two speeds) type, and time constraints, for example of "AT" (transit the point at the given time), "AT OR AFTER" (transit at or after the given time), "AT OR BEFORE" (transit at or before the given time) or "WINDOW" (transit between two times) type.

Note that the speed constraints are generally defined in terms of conventional speed referred to as CAS, the acronym standing for Calibrated Air Speed. This does not constitute a limitation of the present invention which applies more generally to any type of speed constraint, for example expressed in terms of Mach number, air speed referred to as TAS the acronym standing for True Airspeed, or else in terms of ground speed referred to as GS the acronym standing for Ground Speed; all these speeds being well known to the person skilled in the art.

Other constraints exist and are not related to a given waypoint. It is possible to cite the "SPEED LIMIT" or "descent speed limit" which represents a speed not to be exceeded below a given altitude for reasons of noise and traffic sequencing in proximity to airports. For most airports around the world, this speed is 250 kts (kts=knots, i.e. about 130 m/s or 460 km/h) below 10,000 ft (ft=feet, i.e. about 3050 m). Other types of speed or altitude constraints can also exist such as constraints in terms of speed at a certain distance from the runway.

Descent and Approach Profiles

FIGS. 4a, 4b, 4c, 4d, 4e and 4f illustrate several typical descent profiles in terms of altitude and speed. For all these figures, the altitude profile is represented in the upper part of the figure, and the speed profile is represented in the lower part. The speed profile is represented in terms of conventional speed CAS. The abscissa represents the distance DtD (the acronym standing for "Distance To Destination") separating the aircraft from the landing point 21 represented on the extreme right of the figure.

Before describing these various conventional descent profiles in detail, let us recall through a few equations the principles of the vertical evolution of an aircraft in flight. The vertical evolution of a fixed-wing aircraft can be defined by the following equation of dynamics:

$$\sum \vec{F}_{ext} = m \cdot \frac{d\vec{V}}{dt} \qquad (1)$$

in which $F_{ext}$ represents the exterior forces applied to the aircraft, m the mass of the aircraft, and V its speed.

Under projection onto two horizontal and vertical axes, equation (1) is expressed by the following two equations:

in the horizontal plane:

$$m \cdot \frac{dV}{dt} = Tx - Fx - mg \cdot \sin\gamma \qquad (2)$$

and in the vertical plane:

$$F_z = mg \cdot \cos\gamma \qquad (3)$$

in which Tx is the thrust, Fx is the drag, Fz is the lift, and γ is the aerodynamic slope.

The lift can be expressed by the relation:

$$Fz = \tfrac{1}{2}\rho \cdot S \cdot V_{air}^2 \cdot C_z \qquad (4)$$

in which ρ is the density of the air, S the aerodynamic surface area, $V_{air}$ the air speed and $C_z$ the lift coefficient.

Likewise, the drag can be expressed by the relation:

$$F_x = \tfrac{1}{2}\rho \cdot S \cdot V_{air}^2 \cdot C_x \qquad (5)$$

in which $C_x$ is the drag coefficient.

The drag and the lift of the aircraft are related by one and the same aerodynamics of the aircraft. The coefficients of lift $C_z$ and of lift $C_x$ are therefore related by an equation of the type:

$$C_x = f(C_z) \qquad (6)$$

The drag coefficient $C_x$ can generally be determined in an empirical manner, by means of numerical computations or prior wind tunnel trials. This coefficient can generally be expressed by means of a relation of the type:

$$C_x = f(C_{x\_smooth}; C_{x\_conf(i)} \text{ with } i=1\ldots N_{conf}; C_{x\_m}) \qquad (7)$$

in which $C_{x\_smooth}$ represents the drag of the aircraft in the case where the aircraft is in so-called smooth configuration, that is to say when the slats, flaps, airbrakes and landing gear are retracted; $C_{x\_conf(i)}$ with i=1 . . . $N_{conf}$ represents the additional drag in the various possible aerodynamic situations during approach, that is to say with the slats, and/or the flaps, and/or the airbrakes and/or the landing gear deployed; and $C_{x\_m}$ represents the drag induced by the aircraft mass; the function "f" generally being a simple weighted sum of the various coefficients.

It is known finally that the aircraft position, lateral (x) and vertical (z), can be computed by integration as a function of the speed V and of the aerodynamic slope γ by means of the following two relations:

$$dx/dt = V \cdot \cos\gamma, \text{ and } dz/dt = V \cdot \sin\gamma \qquad (8)$$

To summarize, the three variables speed V, aerodynamic slope γ and thrust $T_x$, are connected by two equations (the equations referenced (2) and (3)). A relationship therefore exists between these three quantities. In practice, this signifies that the piloting of the aircraft in the vertical plane can be carried out by fixing two variables, the third being deduced from the equations described hereinabove. Several modes of control in the vertical plane are thus implemented:

fixed thrust and imposed speed mode; the resultant being the slope, fixed slope and imposed speed mode; the resultant being the thrust, fixed slope and imposed thrust mode; the resultant being the speed, fixed thrust and imposed acceleration/deceleration mode; the resultant being the slope.

Other modes of control, not implemented in avionics suites today, could be envisaged without departing from the scope of the present invention.

FIG. 4a represents a first conventional descent profile in terms of altitude and speed. The profile represents the target vertical trajectory of the aircraft between the descent start point and the landing runway 21. The descent start point, referenced T/D the acronym standing for Top of Descent, is characterized by a distance T/D Dist separating it from the landing point 21, an altitude CRZ ALT, and a speed CRZ MACH. In the cruising phase preceding the point T/D, the aircraft is generally in a smooth configuration.

Onwards of this point, the descent and the deceleration are carried out in several steps until the landing point 21 is reached at an altitude RWY ALT and for a landing speed VAPP.

This first descent profile comprises three successive segments:

A first segment 25 carried out at imposed speed and fixed thrust. On this segment, the descent is in general performed in two portions: a first portion on which the descent is performed at an imposed speed MACH equal to the speed DES MACH, and a second portion on which the descent is performed at an imposed speed CAS equal to DES CAS. The speed transition between the two portions is carried out at an altitude XOVER ALT for which the air speed (TAS) corresponding to DES MACH is equal to the air speed corresponding to DES CAS. Thus, the change of speed mode from MACH to CAS is performed at one and the same air speed and there is therefore no change of engine regime.

This segment 25 is in general carried out with the idle regime (IDLE). Typically, the aeroplane lets itself drop at fixed thrust while modifying its attitude (i.e. raising or lowering its nose) so as to submit itself in regard to the speed (DES MACH on the first portion, then DES CAS on the second portion). As explained above, the resultant of this fixed-thrust and imposed-speed piloting mode is the aerodynamic slope. A slightly greater slope is noted on the MACH segment. This is explained by the fact that the slope increases with the speed CAS, and that at constant MACH, the CAS increases as the altitude decreases.

- A second segment 26, the aim of which is to reach a point DECEL of predetermined altitude and speed, respectively FCA ALT and SPDLIM CAS, with as constraint a speed less than or equal to SPDLIM CAS for an altitude less than an intermediate altitude SPDLIM ALT. On the basis of this dual-constraint of the arrival point DECEL and of the intermediate point, the FMS systems determine by iterative computations the point 27 onwards of which it is necessary to begin the deceleration, or stated otherwise the point of transition between the segments 25 and 26. This point 27 of change of speed is labelled by distance at SPDCHG Dist and/or by altitude at SPDCHG ALT.
- A third segment 28 onwards of which the crew must begin to engage the aerodynamic approach configurations, by deploying the slats, and/or the flaps, and/or the landing gear, and/or the airbrakes. The aim of the third segment is to reach the landing point 21 from the DECEL point. A first portion 28a of the latter segment is carried out at constant altitude, making it possible to stabilize the aircraft during the phase of engaging the aerodynamic approach configurations. The approach terminates with a last portion 28b in the course of which the aircraft reaches the runway in general with imposed slope.

This cutting into three segments makes it possible to illustrate the principal steps of this descent profile, typical in aeronautics. In the known state of the art, one also speaks of "descent phase" or DES PHASE for the part preceding the DECEL point (i.e. the segments 25 and 26), and of "approach phase" or APP PHASE for the part following the DECEL point (i.e. the segment 28). The approach phase corresponds to a phase where the dynamic configuration is not smooth. The two portions of the segment 28, referenced 28a and 28b respectively, are dubbed "intermediate approach" or INT APP, and "final approach segment" or FINAL APP respectively, and correspond respectively to the portion carried out at constant altitude and to the portion carried out at constant slope.

On this first descent profile represented in FIG. 4a, the descent phase and the intermediate approach phase can be carried out in the idle regime. On the other hand, the final approach is in the computed regime, the slope and the speed being fixed. This vertical profile is very widespread and regularly implemented on commercial aircraft in the phase of descent and approach to the landing runway. This profile corresponds to the trajectory 10 of FIG. 1 described in the preamble.

FIG. 4b represents a second conventional descent profile in terms of altitude and speed. This profile exhibits numerous points in common with the first profile described in FIG. 4a which will not be repeated here in detail. The aim of this second profile is to remove the plateaus of constant altitude carried out at low altitude. Accordingly the DECEL point is shifted so as to allow an approach deceleration, between the DECEL point and the landing point 21, carried out in the idle regime (the resultant is therefore the slope). Stated otherwise, the segment 29 does not comprise any plateau. The intermediate approach segment 29a, in the course of which the aerodynamic configuration is modified, is carried out at decreasing altitude, contrary to the intermediate approach segment 28a in FIG. 4a. This second descent profile therefore corresponds to the trajectory 12 of FIG. 1 described in the preamble. This is the typical descent profile of a CDA ("Continuous Descent Approach") descent without vertical constraint. Such a descent makes it possible to limit the nuisance (sound, pollutants, etc.) in proximity to the landing runway by removing the plateaus carried out at low altitude.

FIG. 4c represents a third descent profile in terms of altitude and speed. As previously, the points in common with the profiles described in FIGS. 4a and 4b are not repeated in detail. Note that the profiles of FIGS. 4a and 4b are represented in FIG. 4c respectively by the dashed and dotted trajectories 30 and 31. This third profile comprises a vertical constraint at a point $WPT_6$ situated between the descent start point T/D and the DECEL point. In this example, the vertical constraint is of "AT OR ABOVE" type in terms of altitude, the aircraft having to transit the point $WPT_6$ at an altitude greater than or equal to WPT6 ALT, and of "AT OR LESS" type in terms of speed, the aircraft having to transit the point $WPT_6$ at a speed less than or equal to WPT6 SPD. Commencing from the profiles such as described by FIGS. 4a and 4b, the descent profile is modified, for example by the addition of the following two segments:

- A change-of-speed segment 32, carried out at fixed thrust and imposed acceleration/deceleration, connecting a point SPDCHG to the waypoint $WPT_6$; the point SPDCHG being determined so as to comply with the vertical constraint at the point $WPT_6$.
- A segment 33 carried out at fixed slope and imposed speed beyond the point WPT6. The slope is bigger than that resulting from the idle regime IDLE so as to make it possible to regain the descent profile 30 at the second point SPDCHG making it possible to comply with the dual-constraint, described in FIG. 4a, of the DECEL point. This segment 33 with large slope and imposed speed makes it necessary to maintain a minimum thrust (with the idle regime IDLE) and a modification of the aerodynamic configuration (for example deployment of the airbrakes) so as to be able to maintain the speed, without which the aircraft would accelerate.

On this descent profile, the point $WPT_6$ is therefore the point marking the end of the IDLE section, one generally speaks of "last IDLE point". The aircraft is in the smooth configuration and at fixed IDLE thrust before this point. Beyond this point, the descent becomes geometric: the aircraft is at a thrust potentially greater than the IDLE and the aerodynamic configuration may possibly be modified. The sound nuisance and the emissions of pollutants beyond this point are therefore more significant.

FIG. 4d represents a fourth descent profile in terms of altitude and speed. As previously, the profiles of FIGS. 4a and 4b are represented respectively by the dotted and dashed trajectories 30 and 31. This fourth profile comprises a vertical constraint at a point $WPT_5$ of "AT OR BELOW" type in terms of altitude. In certain known FMS systems, this vertical constraint is taken into account by adding to the descent profile 30 such as described by FIG. 4a a segment 35 carried out onwards of the point $WPT_5$. The segment 35 is carried out at fixed slope, a lower slope than the IDLE slope so as to regain the descent profile 30, and at imposed speed, the speed DES CAS. The resultant is a greater thrust than the IDLE reduced thrust, making it possible to maintain a constant speed up to the point SPD CHG, without which there would be deceleration.

Stated otherwise, the introduction of a vertical constraint of "AT OR BELOW" type in terms of altitude at the point $WPT_5$ is taken into account by the FMS, by the addition of a segment making it necessary to leave the idle regime IDLE beyond this point, with here again as corollary an increase in noise and emissions of pollutants. The point $WPT_5$ is the "last IDLE point". Faced with this type of vertical constraint, other FMS systems adapt the descent profile in a slightly different manner as described in the following figure.

FIG. 4e represents a fifth descent profile in terms of altitude and speed. Just as for FIG. 4d, this fifth profile comprises a vertical constraint at the point $WPT_5$ of "AT OR BELOW" type in terms of altitude. In this case, the vertical constraint is taken into account by adding to the descent profile 30 such as described by FIG. 4a two successive segments 36 and 37, carried out onwards of the point $WPT_5$. The segment 36 is carried out at constant altitude (zero fixed slope) and at imposed speed. It therefore requires a greater thrust than the IDLE reduced thrust. The following segment 37 is carried out at fixed thrust equal to the IDLE thrust and at imposed speed. This segment is carried out provided that the aircraft has reached the profile 30, that is to say provided that there has been a return to a reduced-thrust descent.

Stated otherwise, the introduction of a vertical constraint of "AT OR BELOW" type in terms of altitude at the point $WPT_5$ is taken into account by the FMS, by the addition of a first segment with increased thrust making it possible to regain as quickly as possible a descent profile with IDLE thrust. As in the profile described by FIG. 4d, the point $WPT_5$ is the "last IDLE point".

FIG. 4f represents a sixth descent profile in terms of altitude and speed. This profile associates the two vertical constraints introduced previously, that is to say a constraint at the point $WPT_5$ of "AT OR BELOW" type in terms of altitude, and a constraint at the point $WPT_6$ of "AT OR ABOVE" type in terms of altitude and "AT OR LESS" type in terms of speed. In known FMS systems, the descent profile making it possible to comply with these vertical constraints combines the segments of the descent profiles described by FIGS. 4c and 4d (or 4c and 4e). Thus, commencing from the profile 30 such as described in FIG. 4a, the modifications consist in adding:

A plateau segment 40 after the point $WPT_5$, with zero slope and imposed speed, until the point where the descent can be continued with IDLE thrust.

A segment 41 at fixed thrust equal to the IDLE thrust, and at imposed speed. These two segments 40 and 41 make it possible to comply with the vertical constraint at the point $WPT_5$ according to a similar strategy to that described in FIG. 4e.

A segment 42 of change of speed before the point $WPT_6$, carried out onwards of the point SPD CHG, and for a fixed thrust and an imposed acceleration/deceleration.

A segment 43 at fixed slope and imposed speed after the point $WPT_6$, and with a greater slope than the slope obtained in IDLE, rendered necessary for compliance with the altitude constraint at the point $WPT_6$. Accordingly, an IDLE thrust is invoked, combined with a deployment of the airbrakes. These last two segments 42 and 43 make it possible to comply with the vertical constraint at the point $WPT_6$ according to a similar strategy to that described in FIG. 4c.

Thus, the two vertical constraints at the points $WPT_5$ and $WPT_6$ have been able to be taken into account successively. To comply with each constraint, specific maneuvers are necessary. In this example, compliance with the vertical constraint at $WPT_5$ imposes a segment 40 on which the IDLE thrust is not upheld, compliance with the constraint at $WPT_6$ imposes a segment 43 on which the airbrakes are used. The point $WPT_5$ is the "last IDLE point".

The typical descent profiles described by FIGS. 4a to 4f make it possible to illustrate the operating principle of the descent procedures implemented in current FMS systems. This also makes it possible to highlight the limits of known FMS systems, in particular in the case where vertical constraints must be taken into account in the descent and approach phase. Each vertical constraint being taken into account in an individual manner, the maneuvers making it possible to comply with each constraint are engaged successively without taking into account the whole set of constraints. In general, the maneuvers engaged lead to the reduced thrust mode being quit.

It is therefore desirable to have a means for computing a vertical descent trajectory capable of optimizing the CDA procedure, that is to say of maximizing the length of the segment carried out at reduced thrust and in the smooth aerodynamic configuration, between the descent start point and the point beyond which the reduced thrust cannot be upheld. It is also desirable to maximize the number and the length of the segments carried out at reduced thrust that can be integrated into the descent and approach procedure up to the landing point. Finally, it is also desirable to maximize the length of the segment carried out at reduced thrust and in the aerodynamic configuration deployed, between the start point of the approach and the runway.

SUMMARY OF THE INVENTION

For this purpose, the subject of the invention is a method for aiding the navigation of an aircraft, intended to be implemented in a flight management system, for an aircraft between a computation start point and a computation end point; the method being characterized in that it comprises computation steps consisting in:
  collecting a data set comprising a flight plan consisting of a succession of waypoints between the computation start point and the computation end point; vertical constraints being able to be associated with each waypoint,
  determining a corridor, between the computation start point and the computation end point, consisting:
    of a floor trajectory, consisting of a series of profiles defining the minimum altitude permitted to the aircraft, as a function of the vertical constraints of the waypoints,
    of a ceiling trajectory, consisting of a series of profiles defining the maximum altitude permitted to the aircraft, as a function of the vertical constraints of the waypoints,
  splitting the corridor into one or more cells between the computation start point and the computation end point; each cell being defined by a departure point and an arrival point; the departure and arrival points being two waypoints furthest apart of the data set and between which the ceiling trajectory is distinct from the floor trajectory,
  determining for at least one cell a vertical trajectory between the departure and arrival points, complying with the cell altitude constraints defined by the ceiling and floor trajectories, and comprising the longest possible IDLE segment, assembling a target vertical trajectory between the computation start point and the computation end point, integrating the vertical trajectory of the at least one cell;

and a step consisting in determining and displaying maneuvering points of the aircraft making it possible to follow the target vertical trajectory.

Advantageously, the computation of the floor trajectory comprises:
a first initialization step consisting in defining a support point as the computation start point,
an iterative process, on the waypoints of the data set, up to the computation end point, consisting in:
identifying the first waypoint after the support point comprising a vertical constraint of "AT" or "AT OR ABOVE" type,
defining a profile of constant altitude equal to the value of the vertical constraint of the identified waypoint, between the support point and the identified waypoint,
defining the support point for the following iterative computation as the identified waypoint.

Advantageously, the computation of the ceiling trajectory comprises:
a first initialization step consisting in defining a support point as the computation start point,
an iterative process, on the waypoints of the data set, up to the computation end point, consisting in:
identifying the first waypoint after the support point comprising a vertical constraint of "AT" or "AT OR BELOW" type,
defining a profile of constant altitude equal to the value of the vertical constraint of the support point, between the support point and the identified waypoint,
defining the support point for the following iterative computation to be the waypoint.

Advantageously, the iterative process of the floor or upper trajectory computation also comprises steps consisting in:
identifying a waypoint after the support point comprising a slope constraint of "FPA" type,
determining a descent point beyond which the aircraft must descend in order to attain the waypoint while complying with the slope constraint,
defining a first profile of constant altitude between the support point and the descent point, followed by a second profile of decreasing altitude according to the slope constraint up to the waypoint.

Advantageously, the floor or upper trajectory computation is configured to ignore any vertical constraint in a waypoint which compels the aircraft to climb in altitude in order to comply with a vertical constraint at a following waypoint.

Advantageously, the computation of the cells comprises:
a first initialization step consisting in defining the departure point of a first cell as the computation start point,
an iterative process, on the waypoints of the data set, up to the computation end point, consisting in:
identifying the first waypoint after the departure point, belonging both to the floor trajectory and to the ceiling trajectory,
defining this waypoint as the arrival point of the cell,
identifying the first waypoint on the basis of the arrival point, such that the floor trajectory is distinct from the ceiling trajectory after this waypoint,
defining this waypoint as the departure point of the following cell.

Advantageously, the vertical trajectory computation is performed for the cell whose departure point is the computation start point, and is then repeated in the following cells as long as the longest possible IDLE segment of the vertical trajectory of the cell considered makes it possible to join the departure point to the arrival point; the resulting target vertical trajectory defining the longest IDLE segment possible at high altitude.

Advantageously, the vertical trajectory computation is performed for the cell whose arrival point is the computation end point, and is then repeated in the previous cells as long as the longest possible IDLE segment of the vertical trajectory of the cell considered makes it possible, by a backward computation, to join the arrival point to the departure point; the resulting target vertical trajectory defining the longest IDLE segment possible at low altitude.

Advantageously, the vertical trajectory computation is performed in each of the cells; the resulting target vertical trajectory exhibiting the longest possible aggregate length of the IDLE segments of each of the cells.

Advantageously, the computation of vertical trajectory in a cell comprises steps consisting in:
determining an unconstrained IDLE segment maintaining the aircraft speed constant between the departure point and the arrival point,
defining the vertical trajectory of the cell as the unconstrained IDLE segment, when the unconstrained IDLE segment complies with the constraints of the cell, or
seeking whether there exists a modified IDLE segment, making it possible to join the departure point and the arrival point, by modifying the aircraft speed, when the unconstrained IDLE segment does not comply with the altitude constraints of the cell, and determining the vertical trajectory of the cell as the modified IDLE segment when it exists, or
defining the vertical trajectory of the cell as a succession of a first IDLE segment and of a second non-IDLE segment, when no IDLE trajectory complying with the altitude constraints of the cell can be found; a first IDLE segment corresponding to a portion of the unconstrained IDLE segment.

Advantageously, the computation of vertical trajectory in the cell whose departure point is the computation start point comprises a step consisting in, when the unconstrained IDLE segment does not comply with the altitude constraint defined by the floor trajectory of the cell, seeking whether there exists an unconstrained IDLE segment, initiated after the computation start point complying with the constraints of the cell.

Advantageously, the computation of vertical trajectory in a cell in the case where the unconstrained IDLE segment does not comply with the altitude constraint defined by the floor trajectory of the cell comprises steps consisting in:
identifying a current waypoint and a target waypoint between which the unconstrained IDLE segment crosses the floor trajectory,
determining a target segment making it possible to join the current point to the target point while complying with the floor constraint, along a target slope; the current point and the target point being separated by a target length,
determining a corrected IDLE segment on the basis of the current point, of constant minimum slope, along which the aircraft speed is reduced down to a predefined threshold value; the minimum slope being determined so as to maximize the length of the corrected IDLE segment;
determining the vertical trajectory in the cell by comparing the target segment with the corrected IDLE segment; the vertical trajectory between the current point and the target point being able to comprise:

an IDLE segment of slope equal to the minimum slope, and a second IDLE segment carried out at constant speed; or an IDLE segment of slope and of length equal to the corrected IDLE segment followed by a non-IDLE segment.

Advantageously, the computation of vertical trajectory in a cell in the case where the unconstrained IDLE segment does not comply with the altitude constraint defined by the ceiling trajectory of the cell comprises steps consisting in:

identifying a current waypoint and a target waypoint between which the unconstrained IDLE segment crosses the ceiling trajectory, determining a target segment making it possible to join the current point to the target point while complying with the ceiling constraint, along a target slope; the current point and the target point being separated by a target length, determining a corrected IDLE segment on the basis of the current point, of constant maximum slope, along which the aircraft speed is increased up to a predefined threshold value; the minimum slope being determined so as to maximize the length of the corrected IDLE segment;

determining the vertical trajectory by comparing the target segment with the corrected IDLE segment; the vertical trajectory between the current point and the target point being able to comprise:

an IDLE segment of slope equal to the maximum slope, and a second IDLE segment carried out at constant speed; or an IDLE segment of slope and of length equal to the corrected IDLE segment followed by a non-IDLE segment.

The invention also pertains to a flight management system comprising code instructions making it possible to perform the computation steps of the method for aiding navigation having the characteristics described above.

BRIEF DESCRIPTION OF THE DRAWINGS

The invention will be better understood and other advantages will become apparent on reading the detailed description of the embodiments given by way of example in the following figures.

For the sake of clarity, the same elements bear the same labels in the various figures.

DETAILED DESCRIPTION

General Logic Diagram of the Method for Aiding the Navigation

Figure 5:
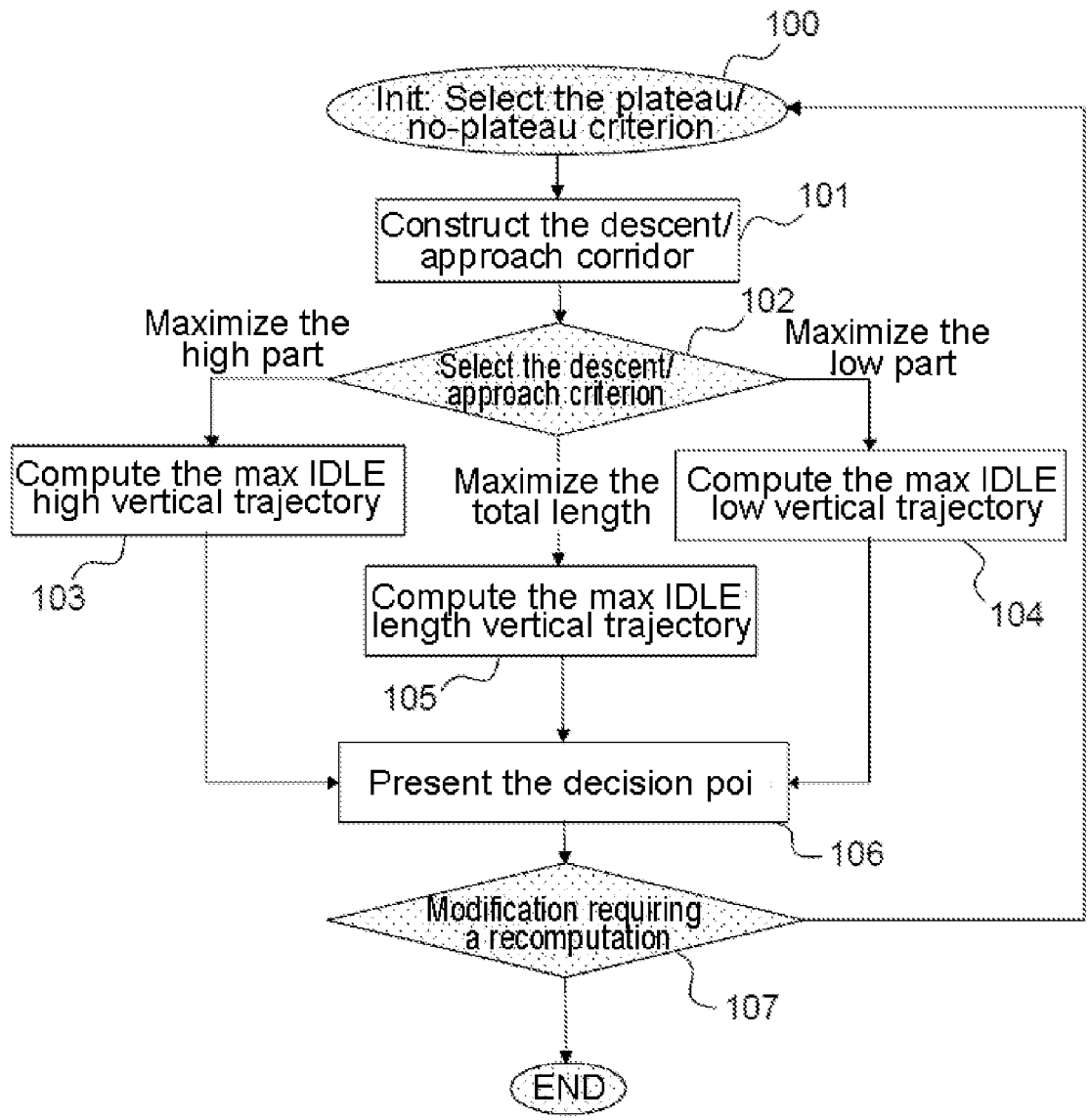
FIG. 5 represents in the form of a logic diagram the steps of an exemplary method for aiding navigation according to the invention.

FIG. 5 represents in the form of a logic diagram the steps of an exemplary method for aiding navigation according to the invention. We shall rapidly describe these steps. The detailed embodiments of these steps are described subsequently. The method according to the invention is a method for aiding the navigation of an aircraft consisting in computing a descent and approach vertical trajectory and displaying maneuvering points making it possible to follow the computed trajectory. The trajectory computation is preferably carried out aboard the aircraft, before entering the descent procedure towards the landing runway. The trajectory computation can be repeated several times, even in the course of the descent and approach procedure, for example when a new constraint, not integrated into a first trajectory computation, must be taken into account. It is also envisaged that the trajectory computation method be implemented by means of a ground computation station, for example within the air traffic control of an airport for an aircraft during the airport approach.

Figure 1:
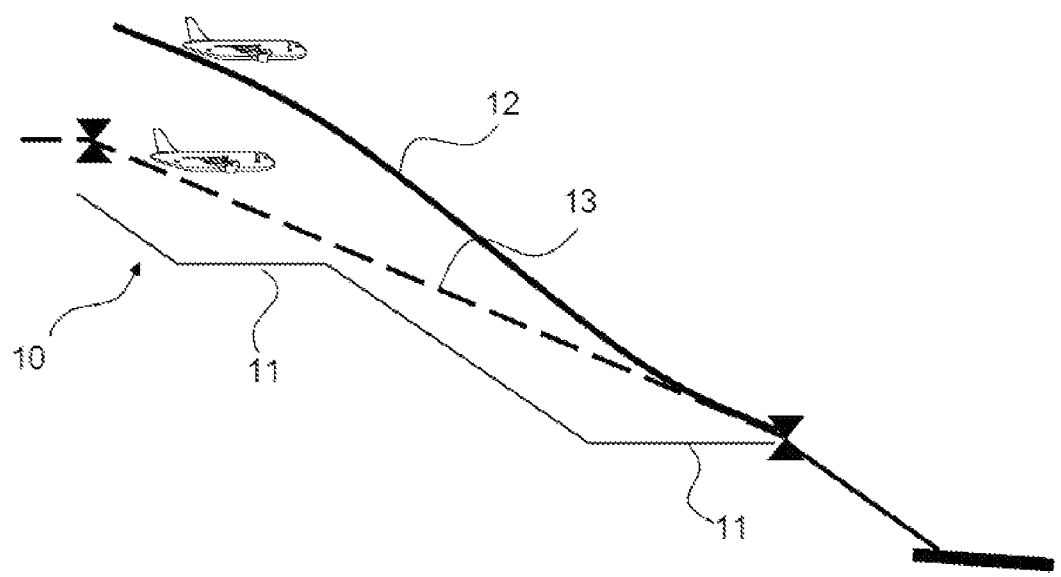
FIG. 1, already presented, illustrates several types of approaches of an aircraft towards a landing runway, FIG. 2, already presented, represents a known system for aiding navigation, commonly referred to as FMS, FIG. 3, already presented, illustrates a conventional flight plan of an aircraft proceeding to a landing runway, FIGS. 4a, 4b, 4c, 4d, 4e and 4f, already presented, illustrate several typical descent profiles in terms of altitude and speed.
Figure 2:
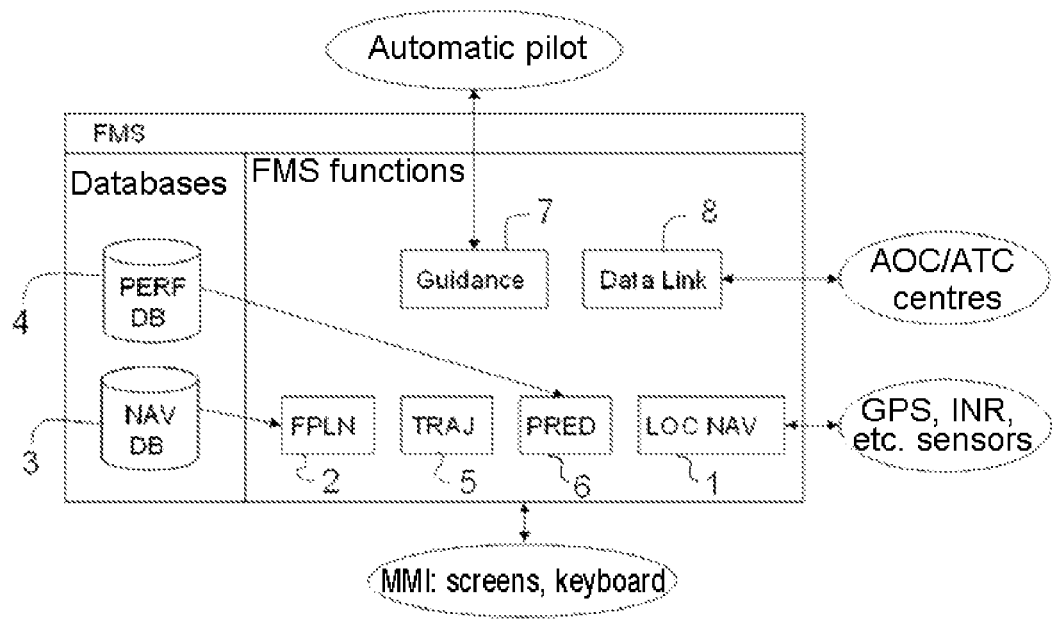
Figure 3:
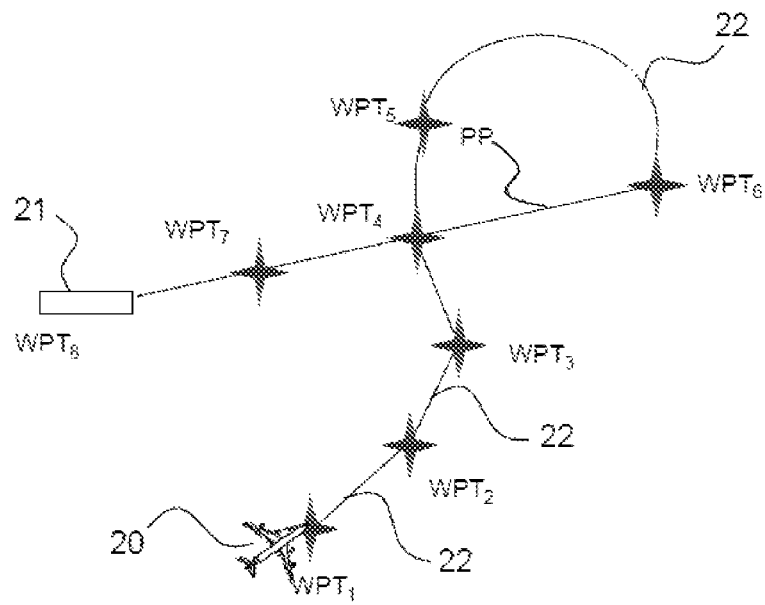

The trajectory computation method relies on the functions available in known FMS systems, and notably the functions presented by FIG. 2. It is envisaged that the computation method according to the invention be implemented within airborne FMS systems on aircraft. This type of method can also be implemented on-board by other systems known to the person skilled in the art such as EFBs, the acronym standing for Electronic Flight Bag, or touch-sensitive tablets. Preferably, the method implements a backward computation, commencing from the landing runway and backtracking along the vertical trajectory up to the descent start point. It is also envisaged, in an alternative implementation, that a forward trajectory computation be undertaken.

The method pertains to the computation and the display of a vertical trajectory, between a computation start point $WPT_{start}$, for example the descent start point T/D, and a computation exit point $WPT_{end}$, for example the landing point 21, and comprising a descent segment followed by an approach segment. The vertical trajectory must make it possible to comply with a predefined set of vertical constraints $CV_i$ at waypoints $WPT_i$ of the flight plan. The computed vertical trajectory must also take account of a set of landing constraints, pertaining notably to the definition of the DECEL point, or to the necessity, the possibility or the impossibility of carrying out an intermediate approach segment at constant altitude.

The method seeks to define a vertical trajectory for the aircraft comprising at least one IDLE segment between the computation start point $WPT_{start}$ and the computation exit point $WPT_{end}$. The aim of the method is also to make it possible to optimize the length of the IDLE segment according to several possible criteria.

Figure 4A:
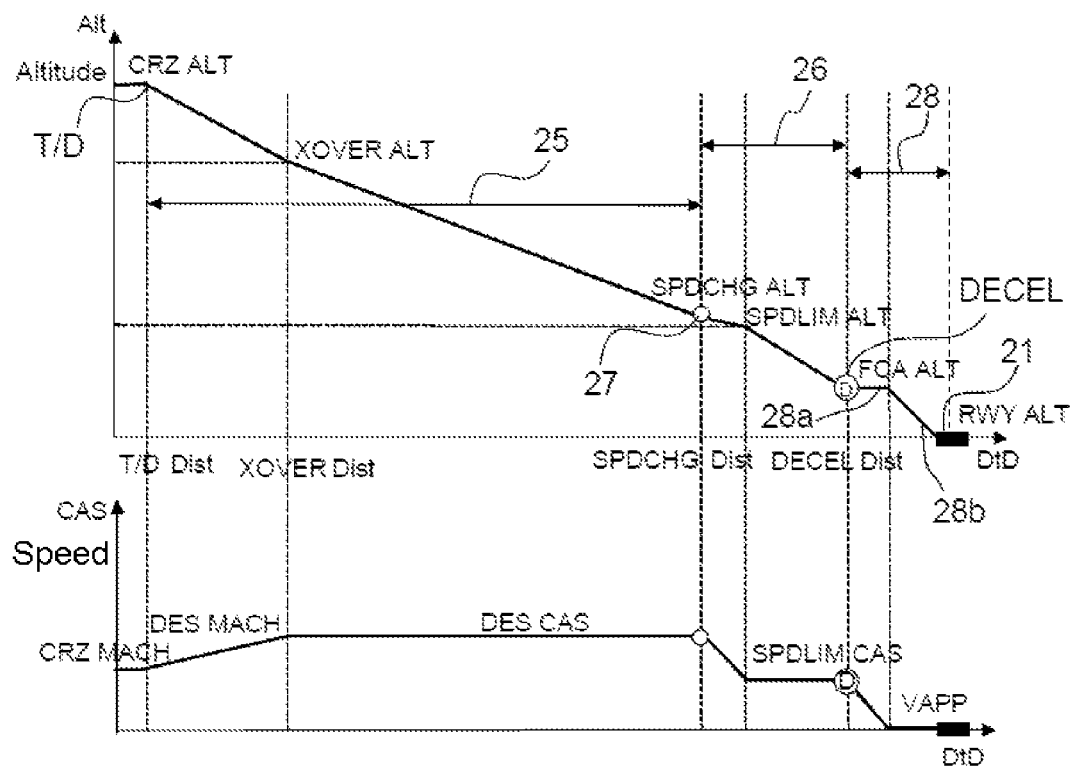
Figure 4B:
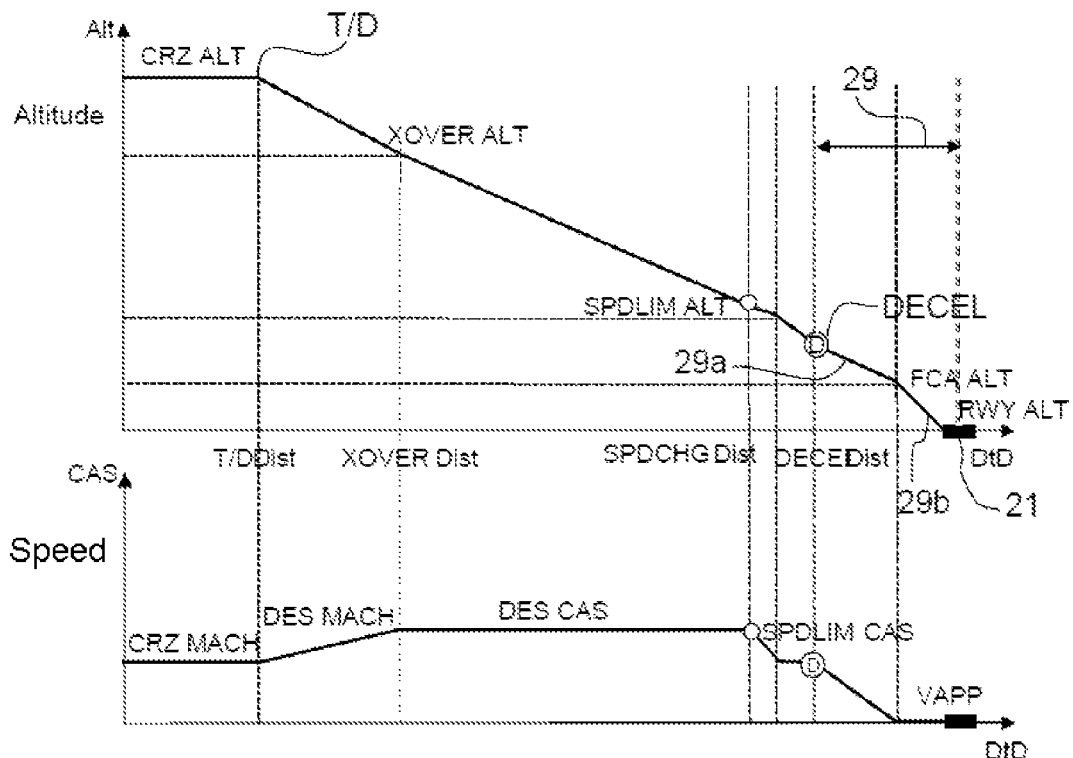
Figure 4C:
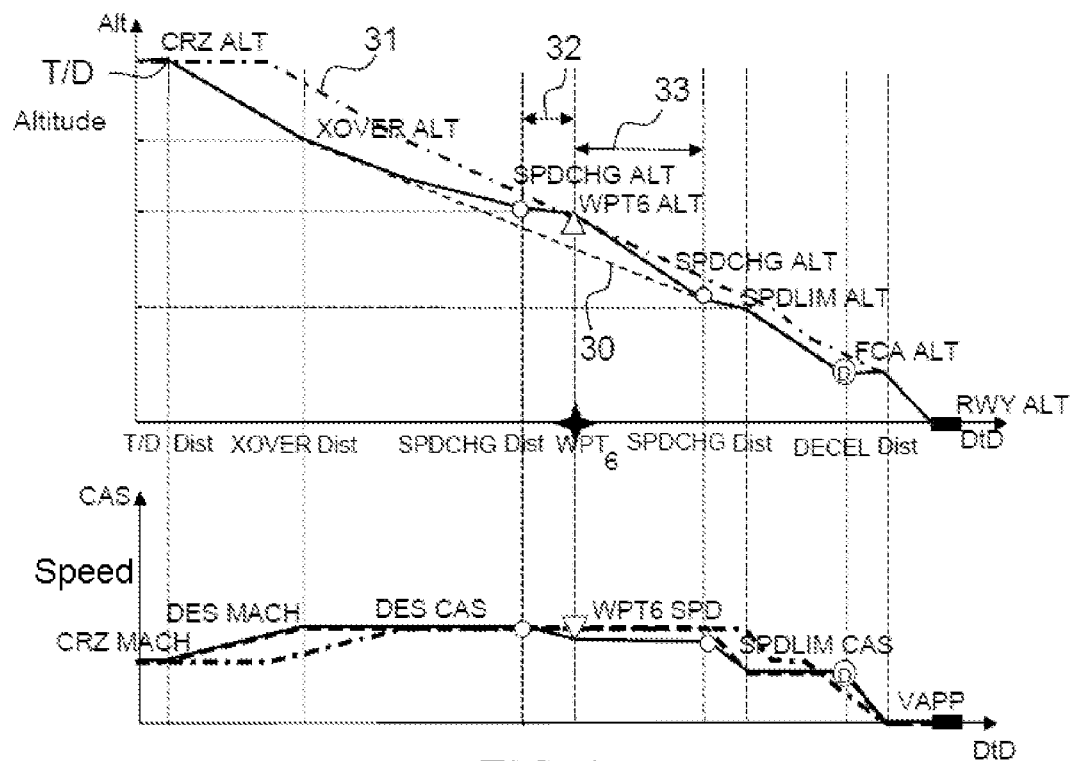
Figure 4D:
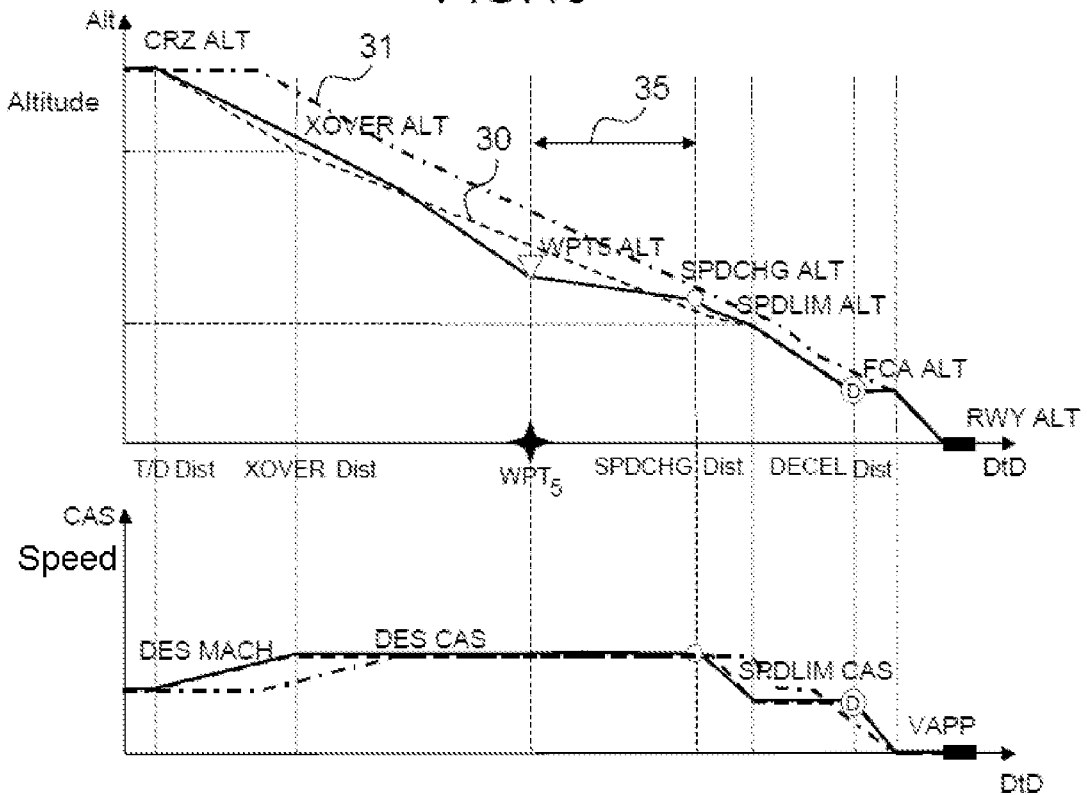
Figure 4E:
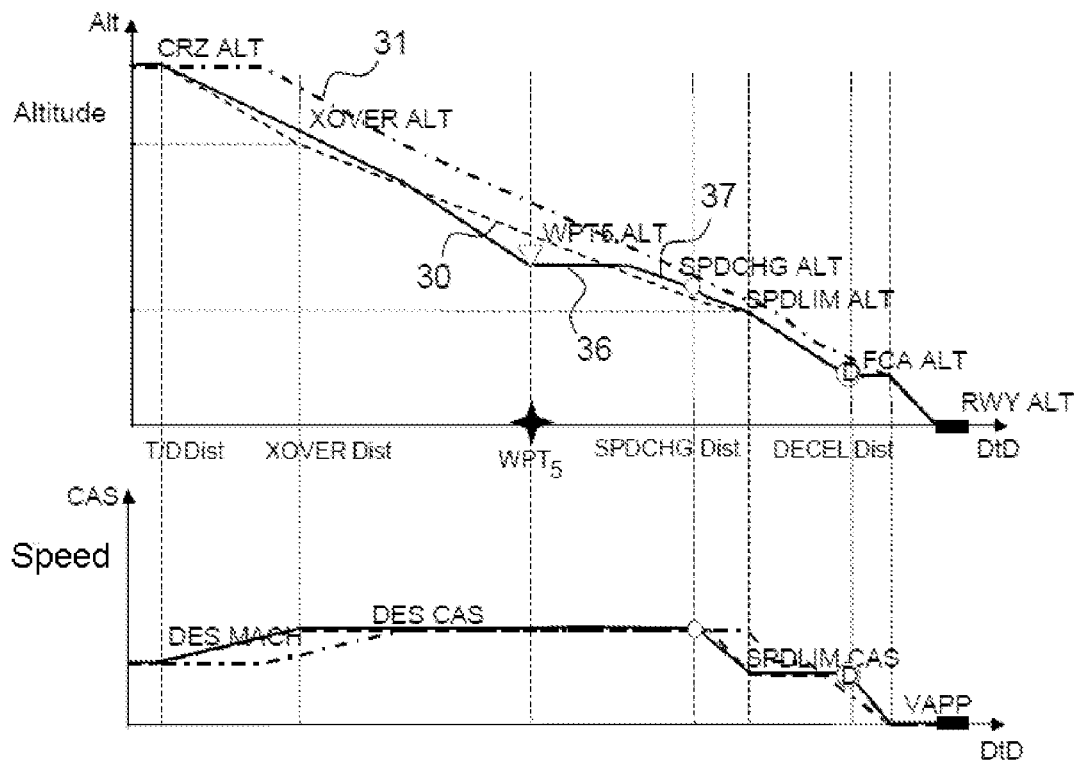
Figure 4F:
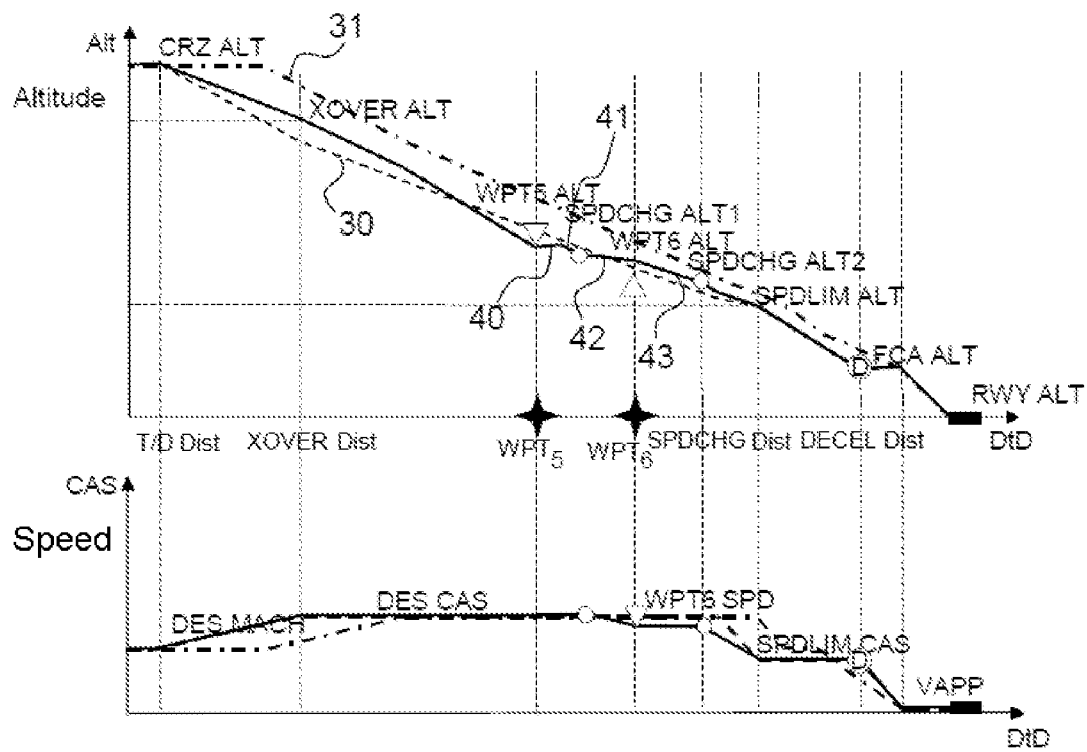

Accordingly, the method comprises the following steps:

An initialization step 100, consisting in selecting between three options:
- the approach segment must be carried out at least partially at constant altitude; the approach segment then comprising an intermediate approach segment of constant altitude such as the segment 28a of the profile described by FIG. 4a, or
- the approach segment must not be carried out at constant altitude; the approach segment comprising an intermediate approach segment of decreasing altitude such as the segment 29a of the profile described by FIG. 4b, or
- the approach segment can be carried out at least partially at constant altitude; the approach segment comprising an intermediate approach segment of constant altitude or of decreasing altitude, such as the segments 28a or 29a of the profiles described by FIGS. 4a and 4b.

This selection can be carried out by means of a pre-established configuration file, or by reception of a command from the ground, or at the start of computation by an operator, for example the pilot of the aircraft when the method is implemented in an onboard FMS system.

A step 101 of constructing an altitude corridor, between the descent start point and the landing point, and consisting:
- of a floor trajectory $B_{inf}$, consisting of a series of profiles defining the minimum altitude permitted to the aircraft, as a function of the vertical constraints $CV_i$ of the waypoints $WPT_i$,
- of a ceiling trajectory $B_{sup}$, consisting of a series of profiles defining the maximum altitude permitted to the aircraft, as a function of the vertical constraints $CV_i$ of the waypoints $WPT_i$, A step 102 of selecting between three modes of computation of the vertical trajectory, making it possible to optimize either:
- the length of the high-altitude IDLE segment,
- the length of the low-altitude IDLE segment, or
- the aggregate length of the IDLE segments.

The selection can be made by means of a pre-established configuration file, or by a third party automatic system, or else directly by an operator.

A vertical trajectory computation step 103 making it possible to optimize the length of the high-altitude IDLE segment, the corresponding vertical trajectory being dubbed "MAX IDLE high" trajectory.

A vertical trajectory computation step 104 making it possible to optimize the length of the low-altitude IDLE segment, the corresponding vertical trajectory being dubbed "MAX IDLE low" trajectory.

A vertical trajectory computation step 105 making it possible to optimize the aggregate length of IDLE segments, the corresponding vertical trajectory being dubbed "MAX IDLE length" trajectory.

A step 106 of computing and displaying the maneuvering points, making it possible, by modifications of the speed and/or of the aerodynamic configuration of the aircraft, to follow the vertical trajectory computed during one of steps 103, 104 or 105.

An updating step 107, consisting in relaunching the computation method from the initialization step 100, in the case where parameters have been modified, requiring a new trajectory computation. By way of example, the following parameters can be taken into account to decide an updating of the computed vertical trajectory:
- a modification of a pilot or ATM input, the acronym standing for Air Traffic Management designating the air traffic control operators, having an impact on the trajectory equations or prediction equations,
- an event calling into question the relevance of the previous computation, such as for example the finding that a real vertical trajectory is too far apart from the computed trajectory,
- a time countdown periodically triggering a new computation making it possible to optimize the trajectory at regular intervals,
- a non-convergence of the "with plateau" option when the "without plateau" option is permitted in the initialization step 100; or a non-convergence of the "without plateau" option when the "with plateau" option is permitted by the initialization step; the second option being favoured in this case.

Of course, when the trajectory computation (or a new computation) is performed after the aircraft has engaged the descent (the point T/D having then been passed), the trajectory computation is initialized at the lateral position of the aircraft. Stated otherwise, the computation method likens the aircraft position at the moment of the computation to the descent start point T/D. It is also envisaged that a dummy point corresponding to an anticipated, for example by a few seconds, aircraft position be considered as descent start point with the aim of avoiding an initial error which would propagate thereafter.

Construction of a Corridor Permitted to the Aircraft

FIGS. 6a, 6b, 6c, 6d and 6e illustrate a favoured embodiment of step 101 of constructing an altitude corridor.

Figure 6A:
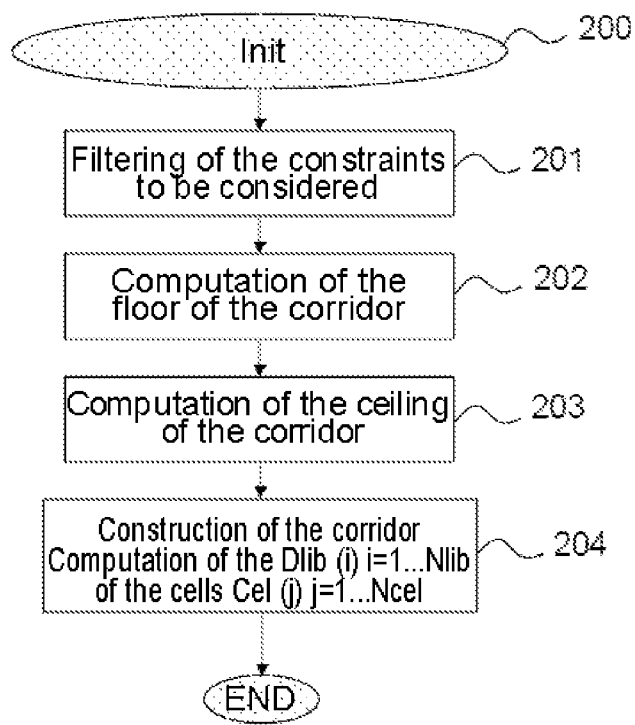
FIGS. 6a, 6b, 6c, 6d and 6e illustrate an exemplary construction of an altitude corridor.

FIG. 6a represents in the form of a logic diagram the sub-steps of this computation. After the selection, carried out in step 100, of the mode of computation of the approach segment, step 101 of constructing the corridor comprises a first initialization sub-step 200 consisting in collecting a set of input data comprising the flight plan and the vertical constraints $CV_i$ that may be associated with the waypoints $WPT_i$ of the flight plan, between a computation start point $WPT_{start}$ and a computation end point $WPT_{end}$, for example the landing point 21.

The computation start point $WPT_{start}$ can be the descent start point T/D, or a dummy point onwards of which the vertical trajectory computation must be engaged. Likewise, the point $WPT_{end}$ can be the landing point or the DECEL point when it is desired to integrate solely the descent segment into the computation, but not the approach segment. The point $WPT_{end}$ can also be any other exit point of the algorithm below which it is not desired to apply the algorithm.

Figure 6B:
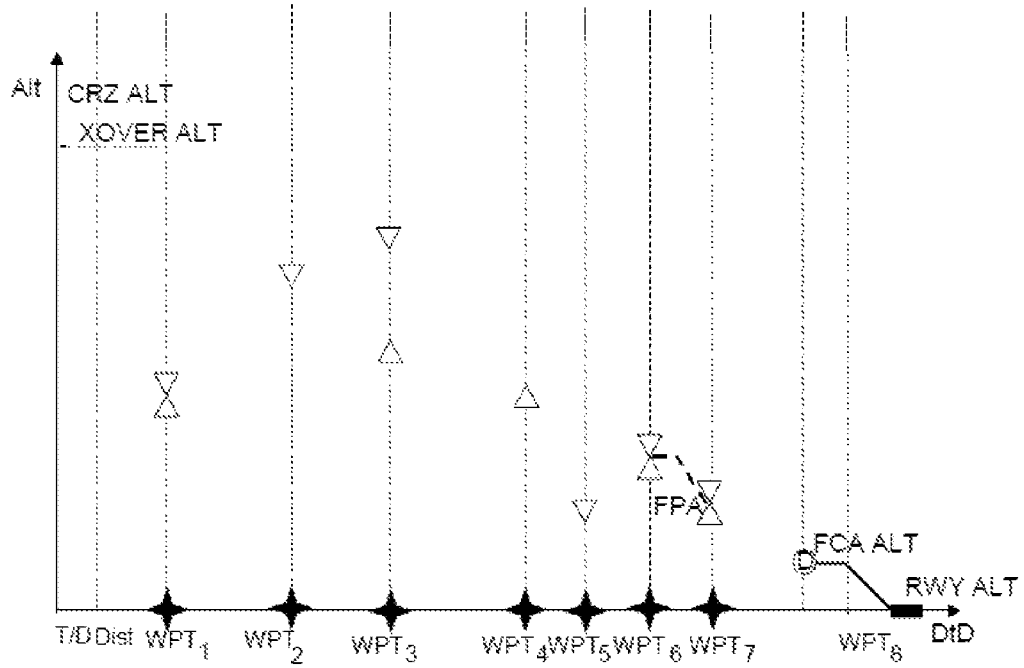

FIG. 6b illustrates an exemplary flight plan in the descent and approach phase comprising the waypoints $WPT_1$ to $WPT_8$ and associated vertical constraints $CV_i$, in particular:
- constraints of "AT" type associated with the waypoints $WPT_1$, $WPT_6$ and $WPT_7$, and represented by hourglasses,
- a constraint of "AT OR ABOVE" type associated with the waypoint $WPT_4$, and represented by a triangle whose tip points upwards,
- constraints of "AT OR BELOW" type associated with the waypoints $WPT_2$ and $WPT_5$, and represented by triangles whose tip points downwards, a constraint of "WINDOW" type associated with the waypoint $WPT_3$, represented by an open hourglass.

Step 101 thereafter comprises a filtering sub-step 201 consisting in deleting vertical constraints to be ignored from the set of input data. Indeed, in the course of a descent procedure, the aeronautical regulations prohibit the aircraft from climbing in altitude. The descent and approach procedures are generally constructed to comply with this requirement, so that in the majority of situations, the filtering sub-step 201 will not lead to vertical constraints being eliminated. However, in so far as the crew is free to manually modify the flight plan vertical constraints, situations can arise where it is necessary to ignore vertical constraints not complying with the regulatory requirement of no climbing in altitude. This situation is illustrated in FIG. 6b for the waypoints $WPT_1$ and $WPT_5$. The "AT" constraint at the point $WPT_1$ would force the aeroplane to climb in order to comply with the "WINDOW" constraint of $WPT_3$. This vertical constraint is ignored. Likewise, the "AT OR BELOW" constraint on $WPT_5$ is ignored since it would make it necessary to climb in altitude in order to make it possible to comply with the "AT" constraint of the point $WPT_6$. Note here that a constraint of "WINDOW" type is treated hereinafter as being both a constraint of "AT OR BELOW" and "AT OR ABOVE" type.

On completion of the filtering sub-step, the ceiling and floor trajectories defining the corridor are determined in two computation sub-steps 202 and 203.

Figure 6C:
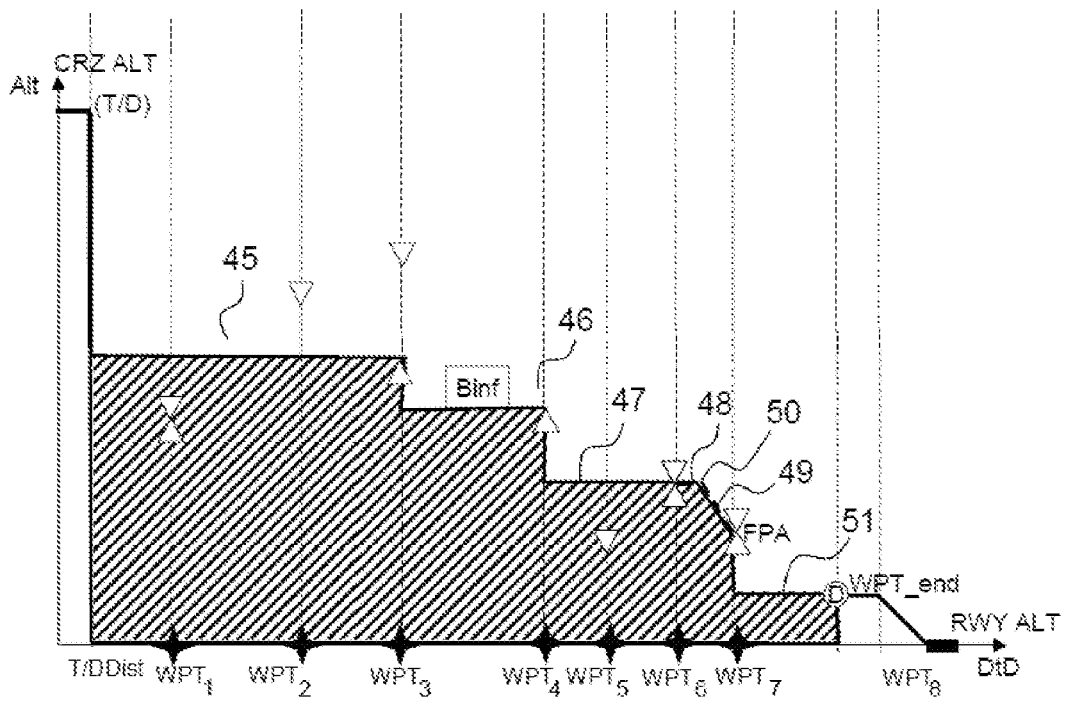

FIG. 6c illustrates sub-step 202 of computing the floor trajectory $B_{inf}$. This trajectory consists of a series of profiles of minimum altitude permitted to the aircraft. The hatched zone represents a zone prohibited to the aircraft in order to comply with the vertical constraints $CV_i$ after the filtering sub-step. Sub-step 202 of computing the floor trajectory $B_{inf}$ comprises:

a first initialization step consisting in defining a support point as the computation start point $WPT_{start}$,
an iterative process, on the waypoints, consisting in:
identifying the first waypoint $WPT_i$ after the support point comprising a vertical constraint $CV_i$ of "AT" or "AT OR ABOVE" type,
defining a profile of constant altitude equal to the value of the vertical constraint at this waypoint, between the support point and the identified waypoint,
defining the support point for the following iterative computation as the identified waypoint;
this iterative process being repeated until the computation end point $WPT_{end}$ is attained, a last vertical profile of constant altitude equal to the vertical constraint at this point being defined between this point and the last support point.

The floor trajectory $B_{inf}$ is thus defined as the succession of the profiles defined by the iterative process. Hereinafter the floor constraint signifies the minimum altitude permitted to the aircraft by the floor trajectory $B_{inf}$.

Advantageously, this algorithm can be enriched to make it possible to take into account slope constraints, known in aeronautics by the acronym "FPA" standing for Flight Path Angle. This is for example the case between the points $WPT_6$ and $WPT_7$ in the example represented in FIG. 6c. The algorithm is adapted in such a way that, in the course of the iterative process, the support point being the point $WPT_6$, it makes it possible to:

detect a slope constraint of "FPA" type,
determine a descent start point beyond which the aircraft must descend in order to attain the waypoint associated with the FPA constraint while complying with the slope requirement, define a first profile of constant altitude between the support point and this descent start point, followed by a second profile of decreasing altitude of slope in accordance with the "FPA" constraint, up to the waypoint associated with this constraint.

The floor trajectory $B_{inf}$ computation in the case represented in FIG. 6c can be summarized in the following manner. Commencing from the computation start point $WPT_{start}$ (here the point T/D), the computation identifies $WPT_3$ as first point comprising a constraint of "AT OR ABOVE" type and defines the segment 45; and then commencing from the support point $WPT_3$, identifies the point $WPT_4$ comprising an "AT OR ABOVE" constraint and defines the segment 46; and then commencing from the support point $WPT_4$, identifies the point $WPT_6$ comprising an "AT" constraint and defines the segment 47; and then commencing from the support point $WPT_6$, the computation detects a slope constraint at the point $WPT_7$, determines the descent start point 50, and defines the segments 48 and 49; and finally, commencing from the support point $WPT_7$, identifies the point $WPT_{end}$ (here the DECEL point) and defines the segment 51.

Figure 6D:
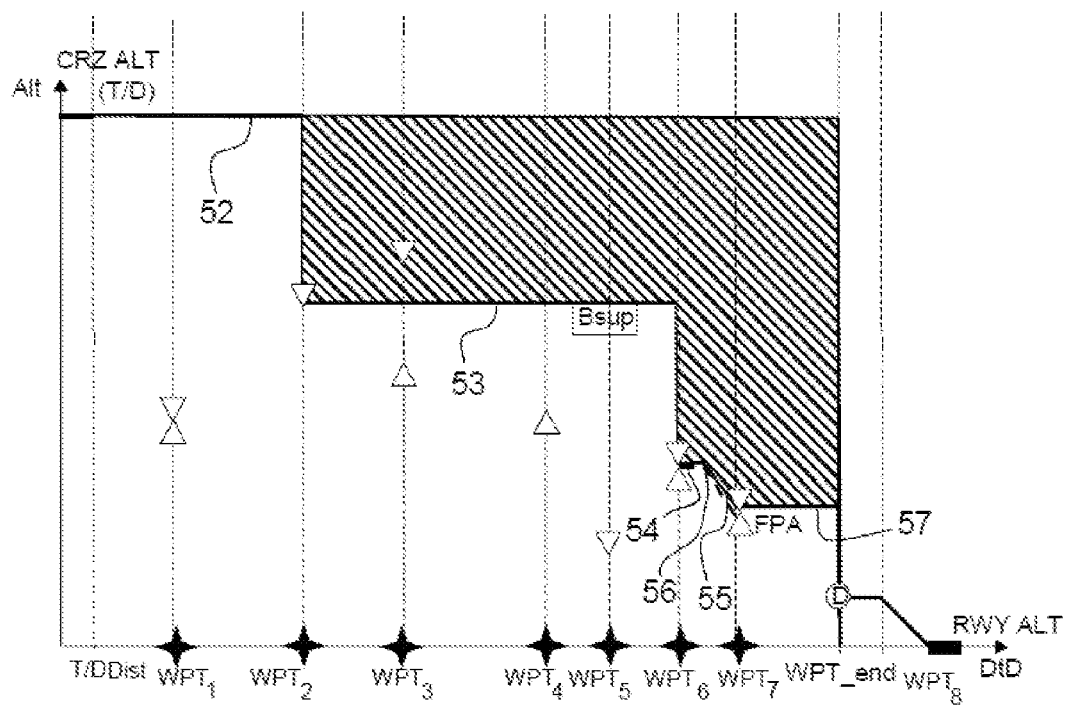

FIG. 6d illustrates sub-step 203 of computing the ceiling trajectory $B_{sup}$. This trajectory consists of a series of profiles of maximum altitude permitted to the aircraft. The hatched zone represents a zone prohibited to the aircraft in order to comply with the vertical constraints $CV_i$ after the filtering sub-step. In a similar manner to the computation of the floor trajectory, sub-step 203 of computing the ceiling trajectory $B_{sup}$ comprises:

a first initialization step consisting in defining a support point as the computation start point $WPT_{start}$,
an iterative process, on the waypoints, consisting in:
identifying the first waypoint $WPT_i$ after the support point comprising a vertical constraint $CV_i$ of "AT" or "AT OR BELOW" type,
defining a profile of constant altitude equal to the value of the vertical constraint at this support point, between the support point and the identified waypoint,
defining the support point for the following iterative computation as the identified waypoint;
this iterative process being repeated until the computation end point $WPT_{end}$ is attained.

The ceiling trajectory $B_{sup}$ is thus defined as the succession of the profiles defined by the iterative process. Hereinafter the ceiling constraint signifies the maximum altitude permitted to the aircraft by the ceiling trajectory $B_{sup}$.

In a manner identical to the computation of the floor trajectory, the algorithm can be enriched to make it possible to take into account slope constraints of "FPA" type. The adaptation of the algorithm is the same as for the computation of the floor trajectory, and is not repeated in detail here.

The ceiling trajectory $B_{sup}$ computation in the case represented in FIG. 6d can be summarized in the following manner. Commencing from the computation start point $WPT_{start}$ (here the point T/D), the computation identifies $WPT_2$ as first point comprising a constraint of "AT OR BELOW" type and defines the segment 52; and then commencing from the support point $WPT_2$, identifies the point $WPT_6$ comprising an "AT" constraint and defines the segment 53; and then commencing from the support point $WPT_6$, the computation detects a slope constraint at the point $WPT_7$, determines the descent start point 56, and defines the segments 54 and 55; and finally, commencing from the support point $WPT_7$, identifies the point $WPT_{end}$ and defines the segment 57. Other ways of computing the ceilings and floors can be performed, such as those of FIG. 11a or 11b, which will be explained hereinafter.

Figure 6E:
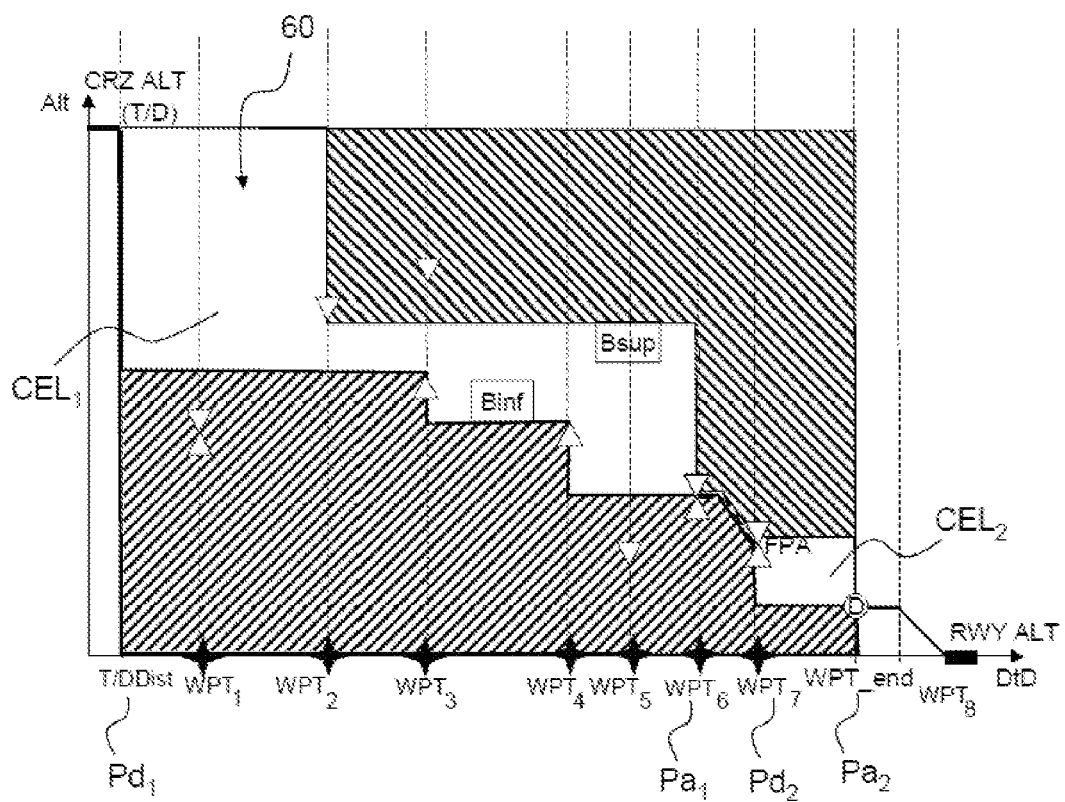

FIG. 6e illustrates sub-step 204 of constructing the corridor. This sub-step defines a corridor 60, between the computation start point $WPT_{start}$ and the computation end point $WPT_{end}$, consisting of the floor trajectory $B_{inf}$ and the ceiling trajectory $B_{sup}$. This sub-step also consists in splitting the corridor 60 into one or more cells $CEL_j$; each cell $CEL_j$ being defined by a departure point $Pd_j$ and an arrival point $Pa_j$; the departure $Pd_j$ and arrival $Pa_j$ points being two waypoints $WPT_i$ of the data set that are furthest apart and between which the floor trajectory $B_{inf}$ is distinct from the ceiling trajectory $B_{sup}$.

More precisely, the computation of the cells $CEL_j$ comprises:
a first initialization step consisting in defining the departure point $Pd_j$ of a first cell $CEL_1$ as the computation start point $WPT_{start}$;
an iterative process, on the waypoints, consisting in:
identifying the first waypoint $WPT_i$ after the departure point $Pd_j$, belonging both to the floor trajectory $B_{inf}$ and to the ceiling trajectory $B_{sup}$,
defining this waypoint $WPT_i$ as the arrival point $Pa_j$ of the cell $CEL_j$,
identifying the first waypoint $WPT_i$ on the basis of the arrival point $Pa_j$, such that the floor trajectory $B_{inf}$ is distinct from the ceiling trajectory $B_{sup}$ after this waypoint $WPT_i$,
defining this waypoint $WPT_i$ as the departure point $Pd_{j+1}$ of the cell $CEL_{j+i}$,
this iterative process being repeated until the computation end point $WPT_{end}$ is attained.

Thus, each cell is delimited so as to allow the aircraft some degrees of freedom in altitude, between the floor trajectory and the ceiling trajectory, and between the departure point and the arrival point. In the case represented in FIG. 6e, the computation leads to the corridor 60 being split into two cells $CEL_1$ and $CEL_2$. The first cell is defined by a departure point $Pd_1$ corresponding to the point T/D and an arrival point $Pa_1$ corresponding to the point $WPT_6$. The second cell is defined by a departure point $Pd_2$ corresponding to the point $WPT_7$ and an arrival point $Pa_e$ corresponding to the DECEL point.

Note that the whole set of figures represents the trajectory according to a trajectory indexed in terms of distance to the landing point (DtD as abscissa in the figures, standing for Distance to Destination). Any other representation, for example in terms of time, distance with respect to the aircraft, or point, is also applicable to the method according to the invention.

On completion of step 101 of constructing the corridor, the method selects in step 102 between three modes of computation of the vertical trajectory. We shall firstly detail the vertical trajectory computation for the mode making it possible to optimize the length of the high-altitude IDLE segment, dubbed "MAX IDLE high" trajectory. Hereinafter the constraints of a cell $CEL_j$ signifies the minimum and maximum altitudes permitted to the aircraft by the floor $B_{inf}$ and ceiling $B_{sup}$ trajectories.

Computation of the "MAX IDLE High" Vertical Trajectory

FIGS. 7, 8, 9a, 9b, 9c, 9d, 9e, 9f, 9g, 10a, 10b and 10c illustrate a favoured embodiment of the vertical trajectory computation step 103 making it possible to optimize the length of the high-altitude IDLE segment.

Figure 7:
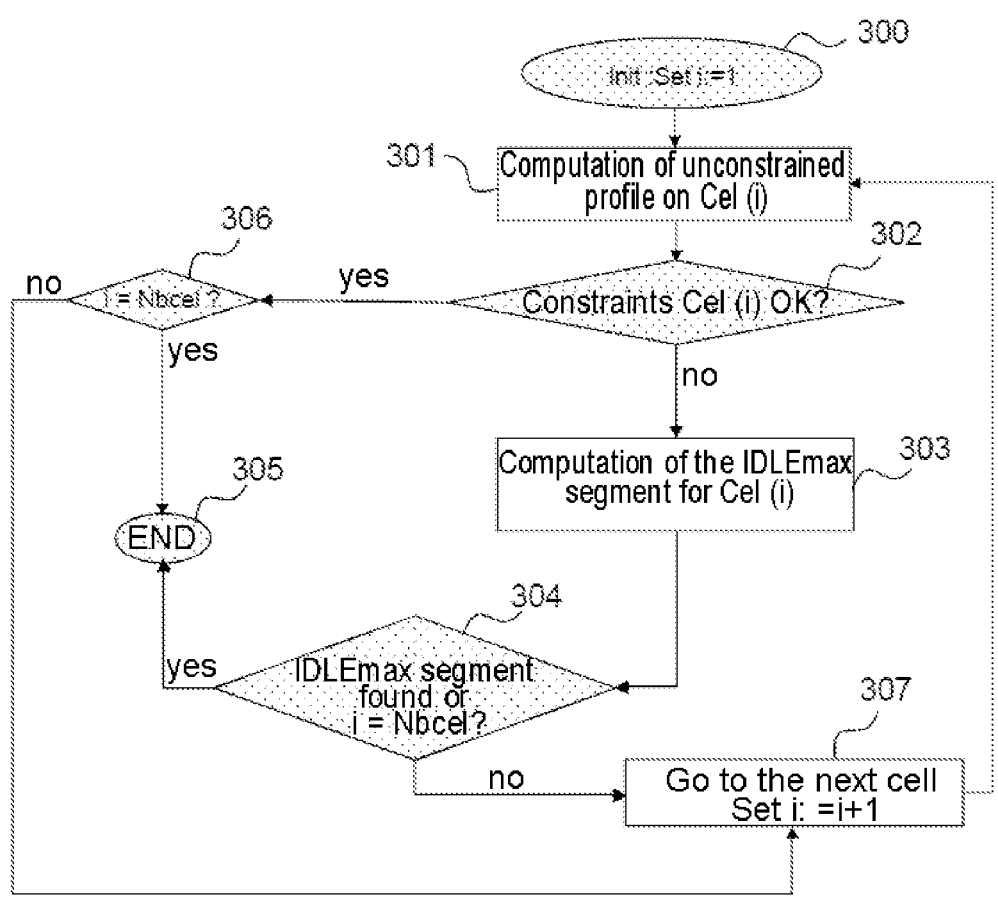
FIG. 7 represents in the form of a logic diagram the sub-steps of the computation of a "MAX IDLE high" trajectory making it possible to optimize the length of the high-altitude segment.

FIG. 7 represents in the form of a logic diagram the sub-steps of the computation of a "MAX IDLE high" trajectory. This computation determines the longest possible high-altitude IDLE vertical trajectory, i.e. achievable at reduced thrust. Going from the highest cell to the lowest cell, the computation is performed in each of the cells until the last cell, or until a cell in which it is not possible to find an IDLE trajectory satisfying the geometric constraints of the cell.

More precisely, the computation of the "MAX IDLE high" vertical trajectory comprises steps consisting in:
initializing the computation, in a sub-step 300, at the first cell $CEL_1$, that is to say the cell whose departure point is the computation start point $WPT_{start}$,
determining, in a sub-step 301, an unconstrained IDLE vertical trajectory 61. Commencing from the aircraft state (position, speed, altitude, mass, etc.) at the departure point $Pd_j$ of the cell $CEL_j$, the unconstrained IDLE trajectory 61 is determined by integrating the equations of dynamics (1) to (8) described in the preamble of the patent application, adopting as thrust mode:
Either the "thrust fixed and speed imposed" mode by adopting a reduced thrust (IDLE) and the aircraft speed at the departure point of the cell,
Or the "thrust fixed and acceleration/deceleration imposed" mode by adopting a reduced thrust and an acceleration or deceleration making it possible to comply with a speed constraint on a waypoint of the cell, or a maximum speed constraint, or else an approach speed constraint.
This trajectory computation by integration can be performed by the functions, such as described previously, available in current FMS systems.
determining, in a sub-step 302, whether the unconstrained IDLE trajectory 61 remains inside the cell $CEL_i$, or stated otherwise whether the trajectory complies with the constraints defined by the floor $B_{inf}$ and ceiling $B_{sup}$ trajectories of the cell considered, or else stated otherwise whether the trajectory complies with the constraints of the cell,
continuing the computation in the following cell $CEL_{i+1}$ (sub-steps 306 and 307) when the IDLE trajectory 61 complies with the constraints of the cell $CEL_i$, or
seeking a modified trajectory capable of complying with the constraints of the cell $CEL_i$ while maintaining a reduced thrust (sub-step 303), when the IDLE trajectory 61 does not make it possible to comply with the constraints of the cell $CEL_i$.

This computation can thereafter be interrupted when for the last cell, the unconstrained IDLE trajectory 61 complies with the constraints of the cell (sub-steps 306 and 305), or when, for one of the cells $CEL_i$, the computation has not made it possible to identify a modified IDLE trajectory making it possible to comply with the constraints of this cell (sub-steps 304 and 305).

We shall describe in greater detail sub-step 303 consisting in seeking a modified IDLE trajectory complying with the constraints of the cell. This sub-step firstly undertakes a first choice:
when this is the first cell, the computation firstly seeks to delay the start of the descent as far as possible, while yet complying with the constraint defined by the ceiling trajectory $B_{sup}$. Stated otherwise, the trajectory is corrected in terms of distance, by shifting it along the abscissa axis.
the computation seeks to modify the slope of the trajectory by modifying the aircraft speed.

Figure 8:
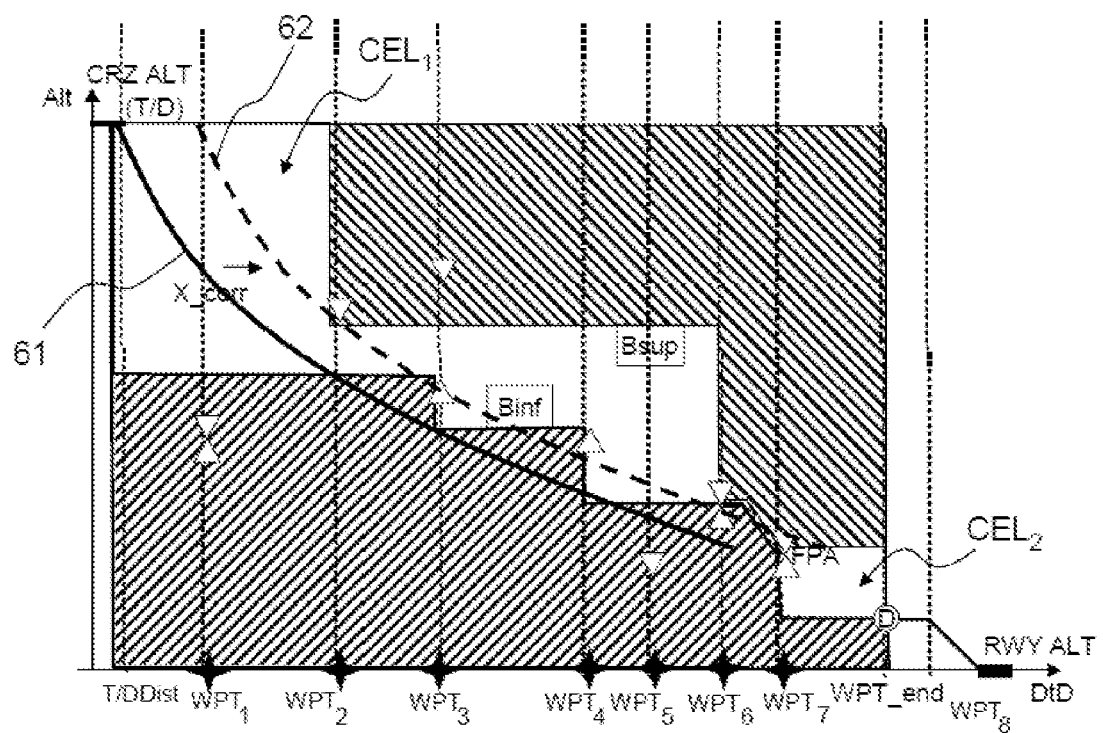
FIG. 8 illustrates an exemplary computation of an IDLE trajectory modified by distance correction.

FIG. 8 illustrates an exemplary computation, carried out in sub-step 303, of an IDLE trajectory modified by distance correction. Under the assumption that the aircraft must not accelerate in the descent or approach phase, this being the most frequent assumption of current FMS systems, the slope of the unconstrained IDLE trajectory 61 corresponds to the largest slope. For this reason, the computation firstly seeks to attain the ceiling trajectory $B_{sup}$, since the aircraft cannot descend with a larger slope.

Thus, when the trajectory computation traverses the first cell, the method comprises a first step consisting in seeking a new waypoint of altitude equal to the altitude at the computation start point $WPT_{start}$ or at the descent start point T/D, on the basis of which an unconstrained IDLE trajectory attains the ceiling trajectory $B_{sup}$. This new unconstrained IDLE trajectory comprises a waypoint whose altitude is equal to the maximum altitude permitted by the ceiling trajectory $B_{sup}$. As represented in FIG. 8, this amounts to shifting the initial trajectory 61 along the abscissa axis, by a value referenced $X\_{corr}$, until a trajectory 62 attaining the first vertical constraint of the ceiling trajectory $B_{sup}$, here the waypoint $WPT_2$. The IDLE trajectory 62 complies with the constraints of the cell.

FIGS. 9a, 9b, 9c, 9d, 9e, 9f and 9g illustrate an exemplary computation, carried out in sub-step 303, of an IDLE trajectory modified by slope correction. This computation is based on the assumption of non-reacceleration of the aircraft in the descent and approach phase. We will subsequently detail, by means of FIGS. 10a, 10b and 10c, an alternative computation for the case where the aircraft is permitted to accelerate.

When in a cell $CEL_j$, the computation of the unconstrained IDLE trajectory cannot comply with the constraints of the cell, the computation comprises the steps consisting in:

seeking the waypoint $WPT_i$ closest to the departure point $Pd_j$ of the cell $CEL_j$ and for which the unconstrained IDLE trajectory does not comply with the constraints of the cell, exiting the modified IDLE trajectory computation step, when the constraint not complied with is the constraint defined by the ceiling trajectory $B_{sup}$ (or stated otherwise, when the trajectory 61 exhibits at this waypoint a greater altitude than the maximum altitude permitted by the ceiling trajectory $B_{sup}$); the waypoint $WPT_i$ is identified as the "Last IDLE point", the IDLE vertical trajectory can be continued up to this waypoint, or conversely, when the constraint not complied with is a constraint defined by the floor trajectory $B_{inf}$, seeking whether a reduction in slope obtained by decelerating the aircraft makes it possible to define a modified IDLE trajectory complying with the constraints of the cell.

Figure 9A:
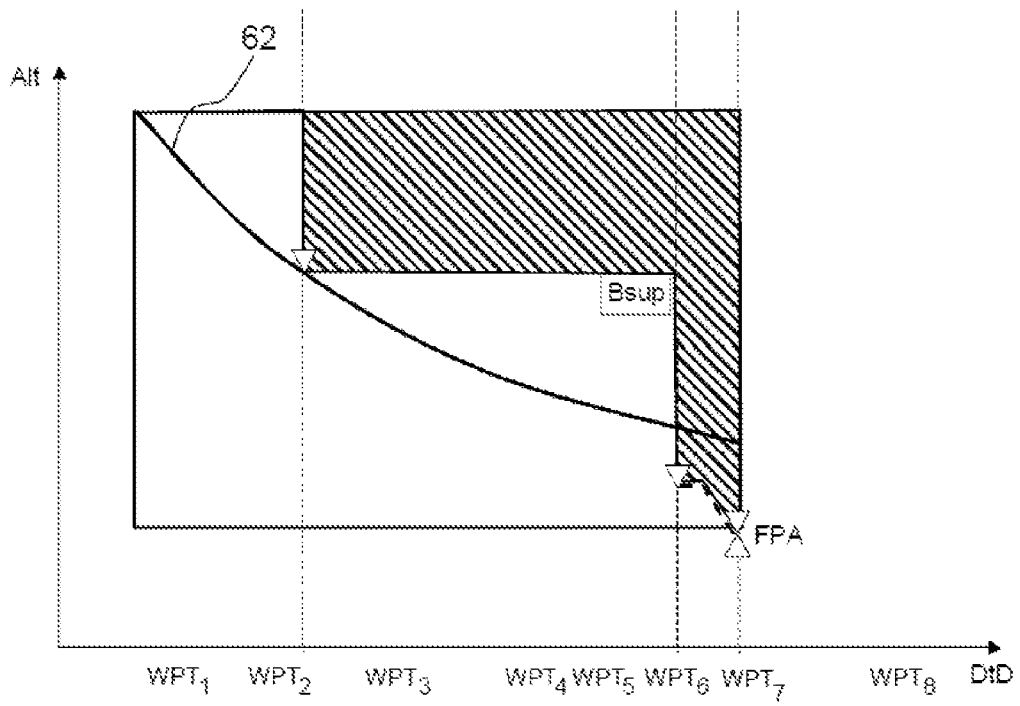
FIGS. 9a, 9b, 9c, 9d, 9e, 9f and 9g illustrate an exemplary computation of an IDLE trajectory modified by slope correction.
Figure 9B:
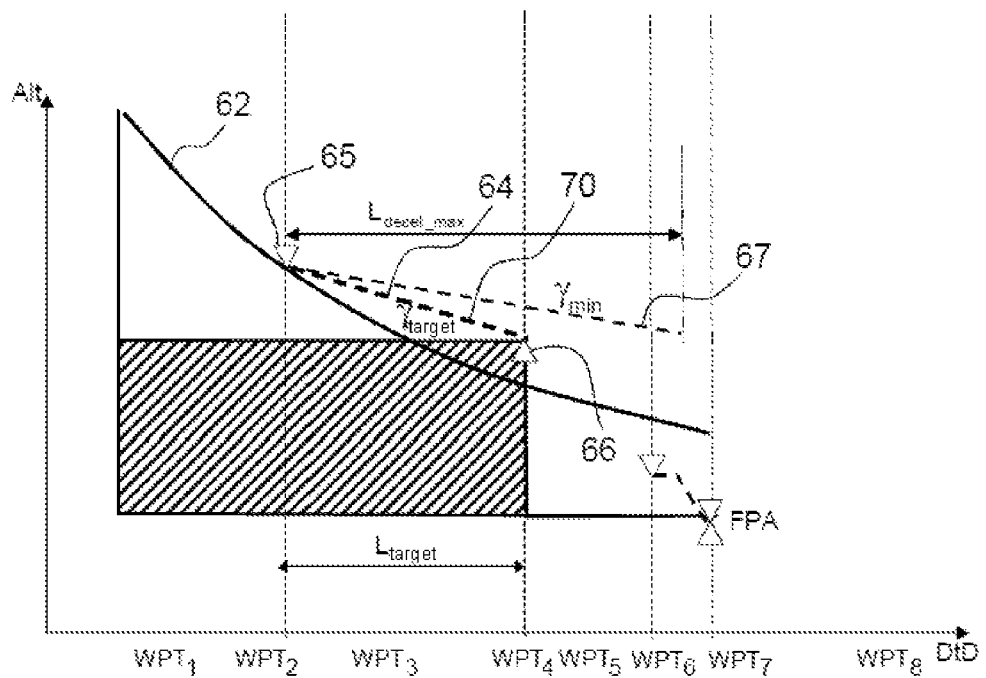
Figure 9C:
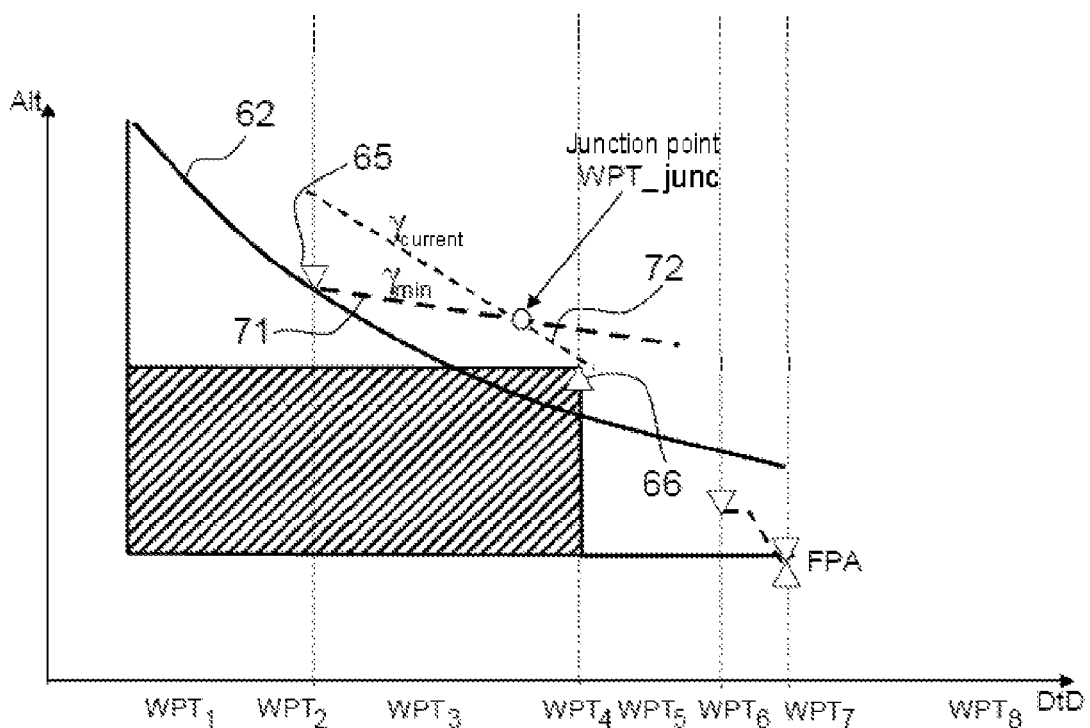
Figure 9D:
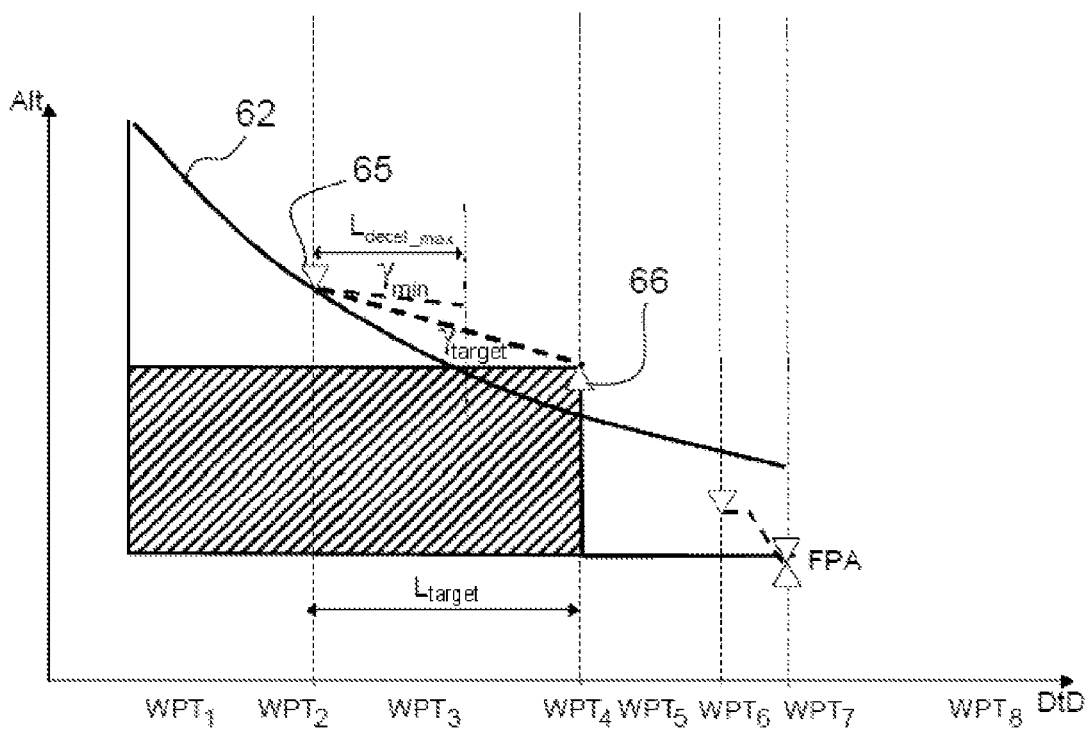
Figure 9E:
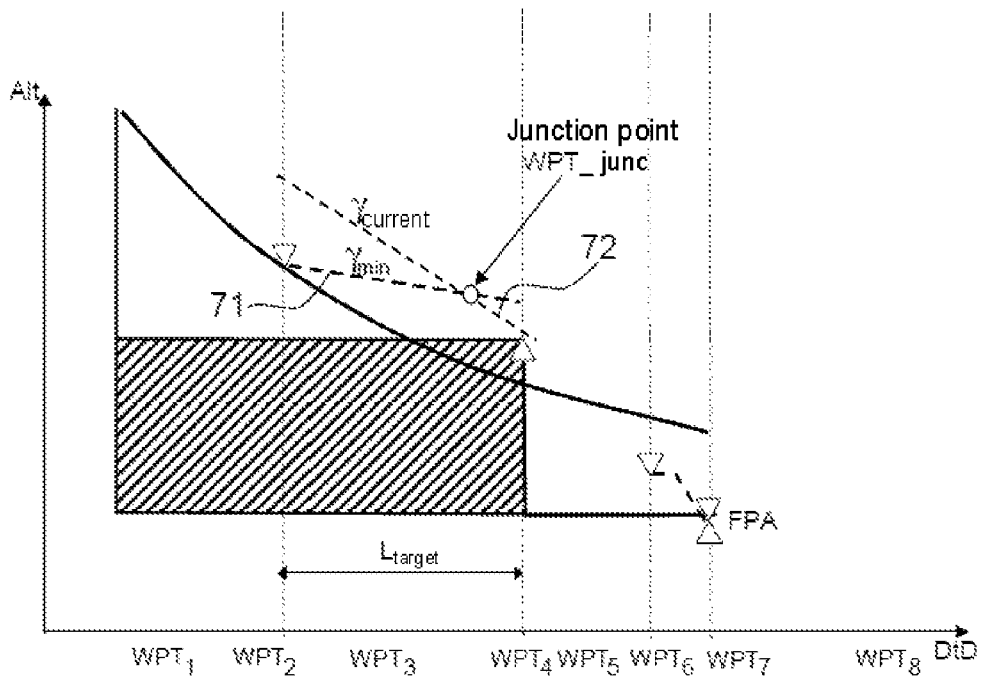

FIG. 9a illustrates the first alternative of the modified-trajectory computation. Represented in this example is the IDLE trajectory 62, obtained as described in FIG. 8, by distance shifting the initial IDLE trajectory 61. As described previously, this unconstrained IDLE trajectory 62 attains the ceiling trajectory $B_{sup}$ at the waypoint $WPT_2$. Thereafter, the computation seeks the first waypoint not complying with the constraints of the cell. In this case, this is the point $WPT_6$ and the constraint not complied with is a ceiling constraint. Consequently, the IDLE trajectory computation is interrupted. The waypoint $WPT_6$ is the "Last IDLE point".

FIGS. 9b to 9f illustrate the second alternative of the modified-trajectory computation. As previously, the IDLE trajectory 62 obtained by distance shifting the initial trajectory 61 has been represented. In this case, the constraint not complied with is a floor constraint. The IDLE trajectory crosses the floor trajectory $B_{inf}$ between a current point 65 and a target waypoint 66 defining the minimum altitude not complied with. The computation seeks whether the constraints of the cell can be complied with through a reduction in the slope by decelerating the aircraft. This computation comprises the following steps:

determining a target segment 64, making it possible to join the current point 65 to the target point 66 while complying with the constraints of the cell, i.e. the floor constraint $B_{inf}$, along a target slope $\gamma_{target}$; and determine a distance $L_{target}$ separating the points 65 and 66, determining a segment 67 of slope $\gamma_{min}$ and of length $L_{decel\_max}$; the slope $\gamma_{min}$ representing the minimum slope that can be upheld by the aircraft at reduced thrust and making it possible to maximize the length $L_{decel\_max}$ traversed by the aircraft along this slope, by considering a predefined deceleration value. Stated otherwise, the segment 67 represents the margin in terms of slope and distance accessible to the aircraft by deceleration.

The computation thereafter comprises several decision rules based on comparing the segments 64 and 67, and more precisely the values of target slope $\gamma_{target}$ and target distance $L_{target}$, respectively with the minimum slope $\gamma_{min}$ and the maximum length $L_{decel\_max}$:

If $\gamma_{target} < \gamma_{min}$ and $L_{target} < L_{decel\_max}$:

The attainable minimum slope is lower than the target slope and the length available for decelerating is larger than the target length. It is therefore possible to comply with the floor constraint $B_{inf}$. In this case the computation makes provision for two alternatives:

The computed vertical trajectory comprises a segment 70 carried out with the slope $\gamma_{target}$ between the points 65 and 66 and obtained by decelerating progressively throughout the segment up to the point 66. This is the case represented in FIG. 9b. The computation is continued in the following cell.

The computed vertical trajectory comprises two segments between the points 65 and 66: a first segment 71 carried out with the slope $\gamma_{min}$; and a second segment 72 carried out with the current slope, that is to say making it possible to maintain a constant speed at reduced thrust. The computation therefore undertakes the computation of the junction point $WPT\_{junc}$ by means of the known functions of FMS systems (typically, this point is the crossover between the segment of length $L_{decel\_max}$ commencing from the point 65 and the half-line of current slope, i.e. the slope of the trajectory without deceleration between the points 65 and 66, going backwards from the point 66). Alternatively, it is possible to reverse the two segments and begin on the current slope and finish on the slope $\gamma_{min}$ so as to adjust and reduce the flight time, making it possible for example to ensure compliance with the arrival time constraint, at the price of greater noise at ground level. This is the case represented in FIG. 9c. The computation is continued in the following cell.

If $\gamma_{target} < \gamma_{min}$ and $L_{target} \geq L_{decel\_max}$:

The attainable minimum slope is lower than the target slope but the length available for decelerating is smaller than the target length over which it is necessary to modify the trajectory. This is the case represented in FIG. 9d. The question which arises is of knowing whether the maximum length $L_{decel\_max}$ is sufficient to allow a trajectory complying with the constraints of the cell. As in the previous case, a trajectory is sought consisting of two segments between the points 65 and 66: a first segment 71 commencing from the point 65 and carried out with the slope $\gamma_{min}$; and a second segment 72 going backwards from the point 66 and carried out with the current slope, that is to say making it possible to maintain a constant speed at reduced thrust. The computation therefore undertakes the computation of the two segments 71 and 72 (or as previously, placing the two segments in the reverse order 72 and 71), by means of the known functions of FMS systems, and seeks whether there exists a junction point WPT_junc between these two segments. The computation makes provision for two alternatives:

A junction point WPT_junc exists, the computed vertical trajectory comprises the two computed segments 71 and 72, and the waypoint WPT_junc. This is the case represented in FIG. 9e. The computation is continued in the following cell.

No possible junction point exists. Stated otherwise, the possible decelerations for reducing the slopes have been exhausted. It is not possible to uphold the constraints of the cell. The longest high-altitude IDLE trajectory has been found. The computation is interrupted. This is the case represented in FIG. 9f.

If $\gamma_{target} > \gamma_{min}$:

Even by decelerating, the resulting slope does not make it possible to maintain an altitude greater than $B_{inf}$ up to the point 66. No trajectory exists which makes it possible to uphold the constraints of the cell. The longest high-altitude IDLE trajectory has been found. The computation is interrupted. This is the case represented in FIG. 9g.

Computation of "MAX IDLE High" Trajectory with Possible Acceleration

It was specified in regard to FIG. 8 that the trajectory computation adopted the assumption that the aircraft must not accelerate in the descent or approach phase. The method for aiding navigation according to the invention also makes provision to be able to circumvent this assumption. Authorization to integrate acceleration phases into the computation will be able to be selected by means of a pre-established configuration file, or at the start of computation by an operator, for example the pilot of the aircraft when the method is implemented in an onboard FMS system. This selection takes place within sub-step 303 of the "MAX IDLE high" trajectory computation.

Figure 10A:
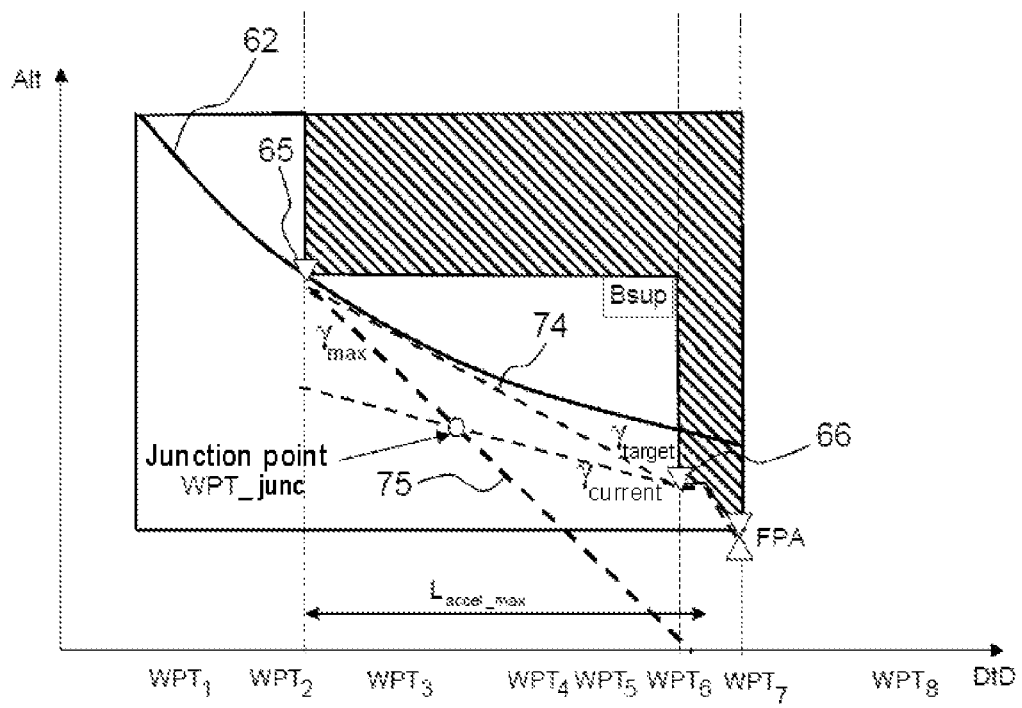
FIGS. 10a, 10b and 10c illustrate an exemplary computation of an IDLE trajectory permitting acceleration of the aircraft.
Figure 10B:
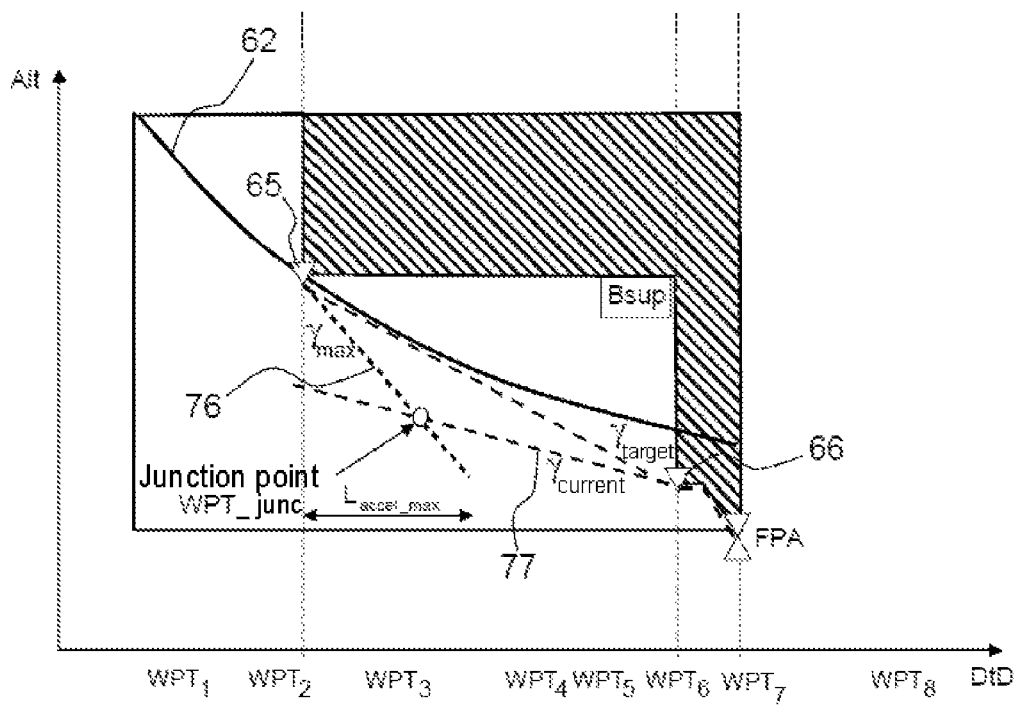
Figure 10C:
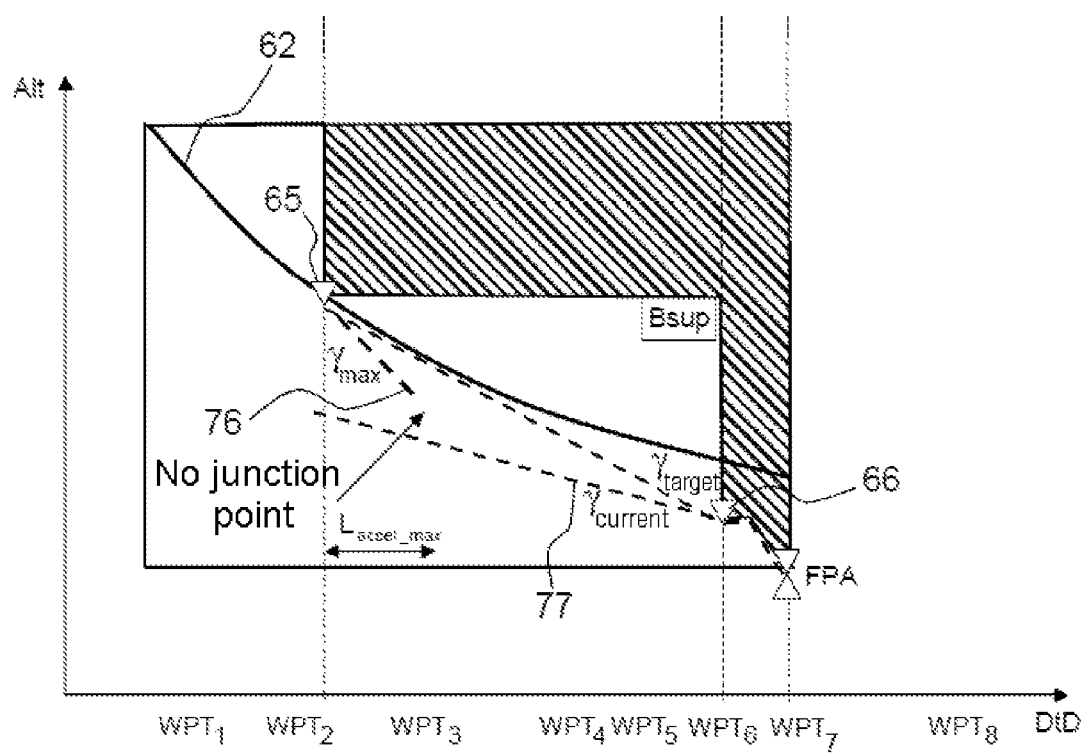

FIGS. 10a, 10b and 10c illustrate an exemplary computation of a "MAX IDLE high" trajectory permitting acceleration of the aircraft. The possibility of accelerating in the course of descent affords the vertical trajectory computation additional degrees of freedom. It becomes possible to define a trajectory of larger slope than the unconstrained IDLE trajectory 62, and to recover by the same token capacity to decelerate later (and thus to modulate the slope).

As represented in FIGS. 10a, 10b and 10c, the unconstrained IDLE trajectory 62 crosses the ceiling trajectory $B_{sup}$, between the current point 65 and the target point 66. The computation then seeks whether the constraints of the cell can be complied with through an increase in the slope obtained by means of an acceleration of the aircraft. This computation comprises the following steps:

determining a target segment 74 making it possible to join the current point 65 to the target point 66 while complying with the ceiling constraint $B_{sup}$, along a target slope $\gamma_{target}$; the current point 65 and the target point 66 being separated by a target length $L_{target}$;

determining a segment 75 of slope $\gamma_{max}$ and of length $L_{accel\_max}$; the slope $\gamma_{max}$ representing the maximum slope that can be upheld by the aircraft in order to attain a predefined permitted maximum speed while maximizing the length $L_{accel\_max}$ traversed by the aircraft along this slope. Stated otherwise, the segment 75 represents the margin in terms of slope and distance accessible to the aircraft by acceleration.

The computation thereafter comprises several decision rules based on comparing the values of target slope $\gamma_{target}$ and target distance $L_{target}$, respectively with the minimum slope $\gamma_{max}$ and the maximum length $L_{accel\_max}$:

If $\gamma_{target} > \gamma_{max}$ and $L_{target} < L_{accel\_max}$:

The attainable maximum slope is higher than the target slope and the length available for accelerating is larger than the target length. It is therefore possible to comply with the ceiling constraint $B_{sup}$.

This is the case represented in FIG. 10a. The computation is continued in the following cell. The computation then determines a vertical trajectory comprising two segments between the points 65 and 66: a first segment 76 carried out with the slope $\gamma_{max}$; and a second segment 77 carried out with the current slope, that is to say making it possible to maintain a constant speed at reduced thrust. The computation undertakes the computation of the junction point WPT_junc by means of the known functions of FMS systems (typically, this point is the crossover between the segment 75, of slope $\gamma_{max}$ and of length $L_{accel\_max}$, which is determined on the basis of the point 65; and the half-line of current slope, i.e. the slope of the constant-speed trajectory between the points 65 and 66, going backwards from the point 66). Alternatively, it is possible to reverse the two segments and begin on the current slope and finish on the slope $\gamma_{max}$.

If $\gamma_{target} > \gamma_{max}$ and $L_{target} \geq L_{accel\_max}$:

The attainable maximum slope is higher than the target slope but the length available for accelerating is smaller than the target length over which it is necessary to modify the trajectory. The question which arises is of knowing whether the maximum length $L_{accel\_max}$ is sufficient to allow a trajectory complying with the constraints of the cell. As previously, a trajectory is sought consisting of two segments between the points 65 and 66: a first segment 76 commencing from the point 65 and carried out with the slope $\gamma_{max}$; and a second segment 77 going backwards from the point 66 and carried out with the current slope, that is to say making it possible to maintain a constant speed at reduced thrust. The computation therefore undertakes the computation of the two segments 76 and 77 (or as previously, placing the two segments in the reverse order 77 and 76), by means of the known functions of FMS systems, and seeks whether a junction point WPT_junc exists between these two segments. The computation makes provision for two alternatives:

a junction point WPT_junc exists, the computed vertical trajectory comprises the two computed segments 76 and 77, and the waypoint WPT_junc. This is the case represented in FIG. 10b. The computation is continued in the following cell.

No possible junction point exists. Stated otherwise, the possible accelerations for increasing the slopes have been exhausted. It is not possible to uphold the constraints of the cell. The longest high-altitude IDLE trajectory has been found. The computation is interrupted. This is the case represented in FIG. 10c.

If $\gamma_{target} < \gamma_{max}$:

Even by accelerating, the resulting slope does not make it possible to maintain an altitude of less than $B_{sup}$ at the point 66. No trajectory exists which makes it possible to uphold the constraints of the cell. The longest high-altitude IDLE trajectory has been found. The computation is interrupted.

Construction of a Corridor with Bounds in Terms of Slope

It is envisaged by the present invention to add to the computation of the corridor permitted to the aircraft the possibility of defining floor $B_{inf}$ and ceiling $B_{sup}$ trajectories in terms of slope. Stated otherwise, the corridor defines upper $B_{sup}$ and lower $B_{inf}$ bounds in terms of slope which are fixed around a radioelectric beam of glideslope type for example, the usual vertical beam of so-called ILS (the acronym standing for Instrument Landing System) ground beacons. The upper and lower bounds can be directed towards one and the same point, for example the landing point 21, one speaks of angular upper and lower bounds. Alternatively, the upper and lower bounds can be directed towards two distinct points thereby defining two parallel slopes, one speaks of linear upper and lower bounds. This type of corridor makes it possible to seek an IDLE trajectory close to a theoretical profile with fixed slope. This allows for example the crew to follow a glide slope when it is aligned with the beam, relatively early in the descent. This further makes it possible to follow the navigation performance with respect to a curved virtual beam, for example in the case of a so-called VRNP descent.

Figure 11A:
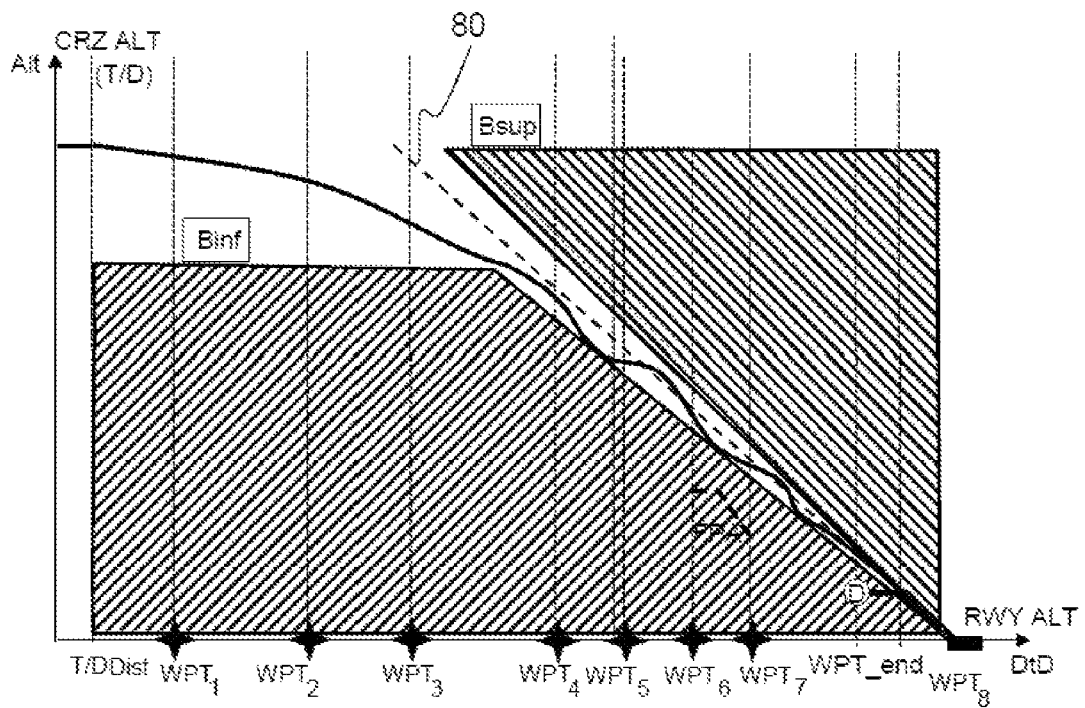
FIGS. 11a and 11b illustrate an exemplary computation of an IDLE trajectory in the case of a corridor with upper and lower bounds in terms of slope.
Figure 11B:
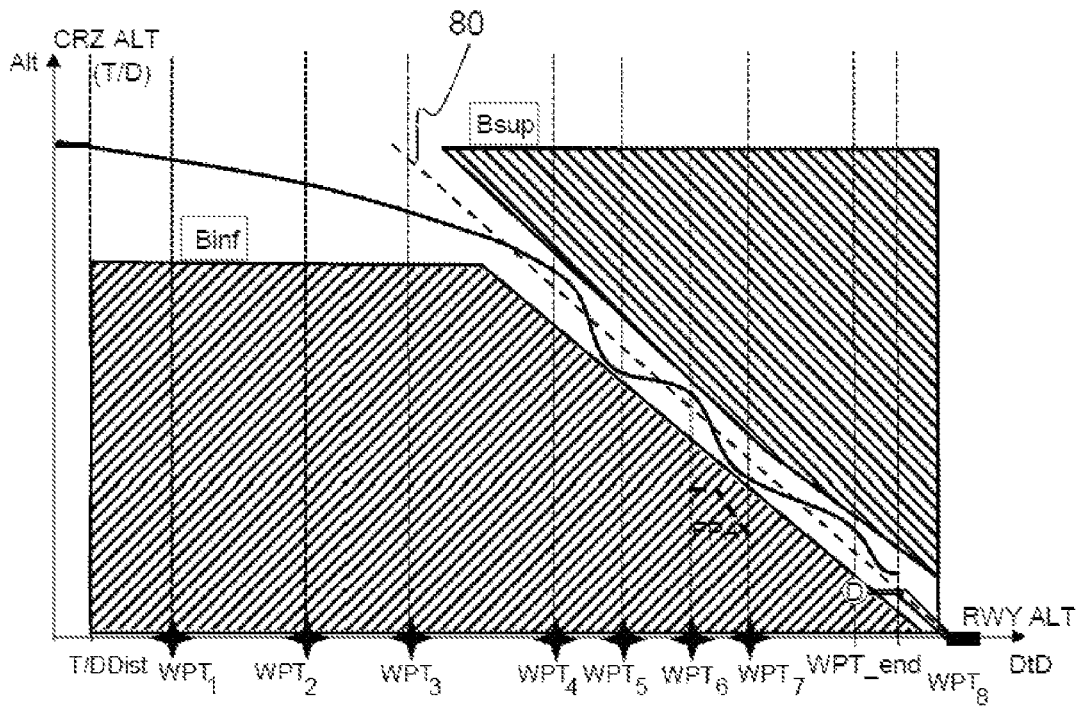

FIGS. 11a and 11b illustrate an exemplary computation of a "MAX IDLE high" trajectory in the case of a corridor with upper and lower bounds in terms of slope. The "MAX IDLE high" trajectory computation described previously leads naturally to the defining of a succession of segments with fixed speed and with deceleration to maintain the aircraft in the corridor. In FIG. 11a, the upper and lower bounds are of angular type with respect to the setpoint beam referenced 80. In FIG. 11b, the upper and lower bounds are of linear type with respect to the setpoint beam referenced 80. Of course, a mixed mode or a piecewise mode can also be envisaged.

Computation of the "MAX IDLE Low" Vertical Trajectory

We have indicated that the method made it possible in a step 102 represented in FIG. 5 to select between three modes of computation of the vertical trajectory. We have described by means of FIGS. 7, 8, 9a, 9b, 9c, 9d, 9e, 9f, 9g, 10a, 10b and 10c the computation of a "MAX IDLE high" vertical trajectory making it possible to optimize the length of the high-altitude IDLE segment. The method also makes it possible to select a "MAX IDLE low" vertical trajectory computation making it possible to optimize the length of the low-altitude IDLE segment.

The logic diagram of this "MAX IDLE low" trajectory computation, corresponding to the computation step 104 in FIG. 5, is identical to that of the "MAX IDLE high" trajectory computation represented in FIG. 7. However, the computation differs from the "MAX IDLE high" computation through the fact that it proceeds in reverse, stated otherwise mirrorwise. The computation does not commence from the descent start point T/D (or from the first point $WPT_{start}$ considered for the IDLE trajectory computation) by advancing to the destination. It commences from the landing point (or from the last point considered for the IDLE trajectory computation, for example the DECEL point) and tracks backwards towards the descent start point. The iteration therefore takes place from the last cell to the first cell. The algorithms are the mirror algorithms also. The acceleration phases are replaced with deceleration phases, and vice-versa; a deceleration in a forward computation corresponding to an acceleration in a backward computation. Note finally that in this case there is no modified-trajectory computation by distance correction.

We have described the main modifications of the algorithm for the "MAX IDLE low" trajectory computation. Commencing from the "MAX IDLE high" trajectory computation algorithm described in detail previously, the person skilled in the art will be able to define in detail the "MAX IDLE low" trajectory computation algorithm.

Computation of the "MAX IDLE Length" Vertical Trajectory

Figure 12:
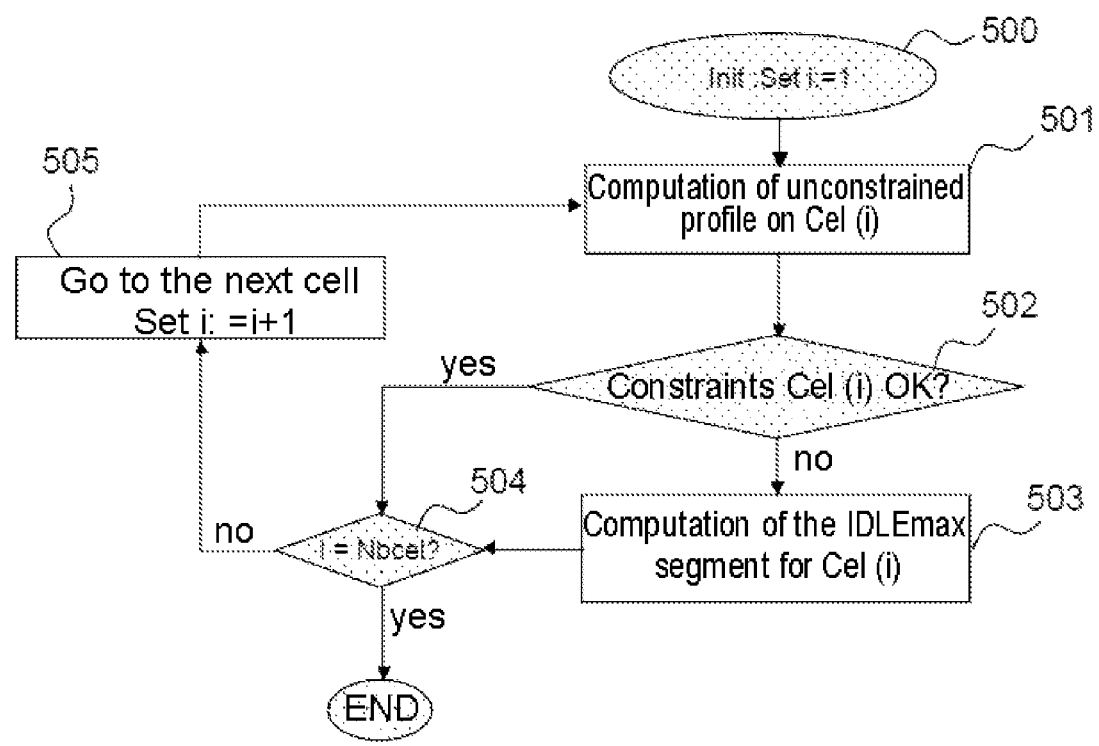
FIG. 12 represents in the form of a logic diagram the sub-steps of the computation of a "MAX IDLE length" trajectory making it possible to optimize the aggregate length of the IDLE segments.

FIG. 12 represents in the form of a logic diagram the sub-steps of the computation of a "MAX IDLE length" trajectory making it possible to optimize the aggregate length of the IDLE segments. This mode of trajectory computation is close to that of the "MAX IDLE high" trajectory computation represented in FIG. 7. It differs therefrom through the fact that the computation is not interrupted when an IDLE trajectory cannot be found.

Commencing from the first cell, the computation seeks an IDLE trajectory, unconstrained or modified, making it possible to comply with the constraints of the cell.

If this trajectory exists, the computation is continued in the following cell.

If the computation does not make it possible to define a modified (in terms of distance or slope, permitting or prohibiting acceleration) IDLE trajectory making it possible to comply with the constraints of the cell, the computation seeks a trajectory carried out—at least partially—at non-reduced thrust (i.e. greater than IDLE) making it possible to comply with the constraints of the cell, before continuing the computation in the following cell.

Figure 9F:
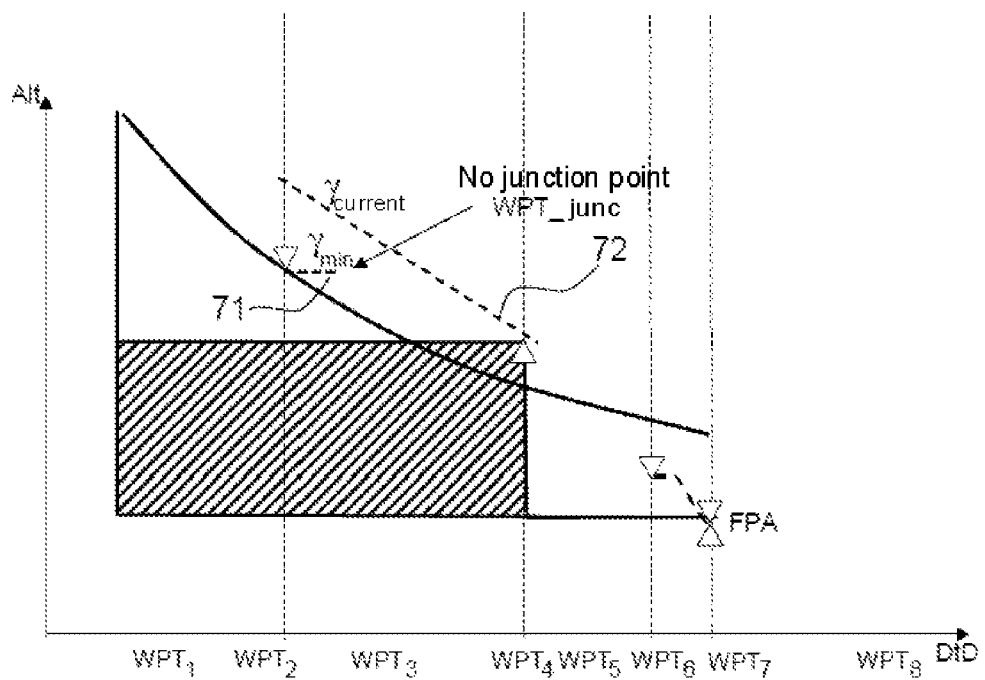
Figure 13A:
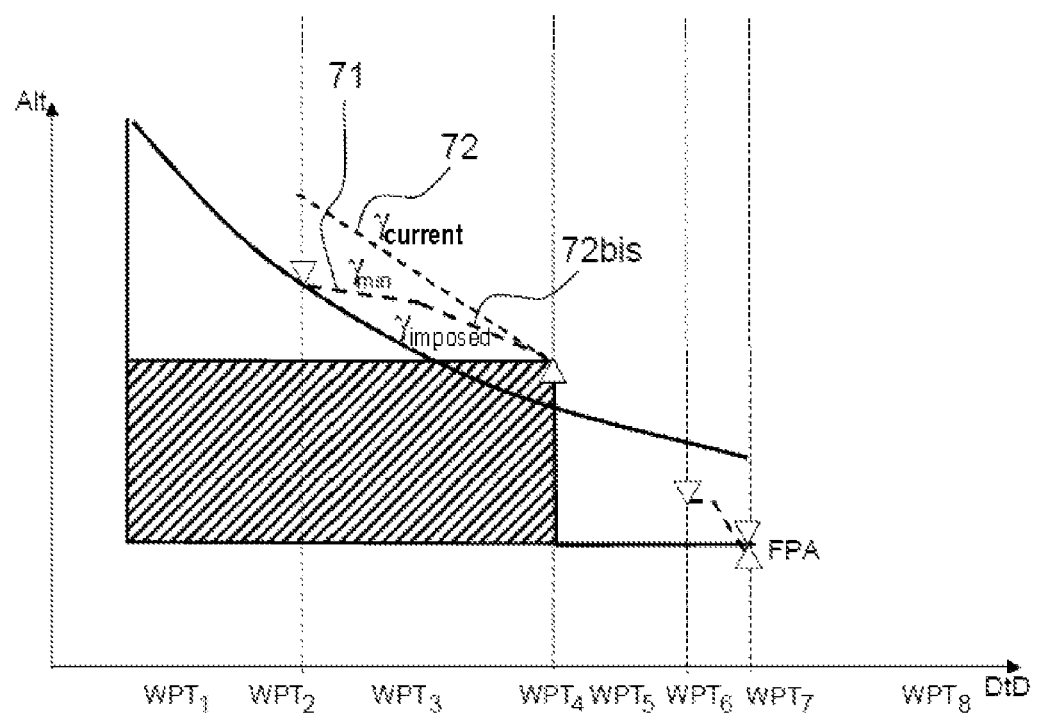
FIGS. 13a and 13b illustrate an exemplary "MAX IDLE length" trajectory computation.
Figure 13B:
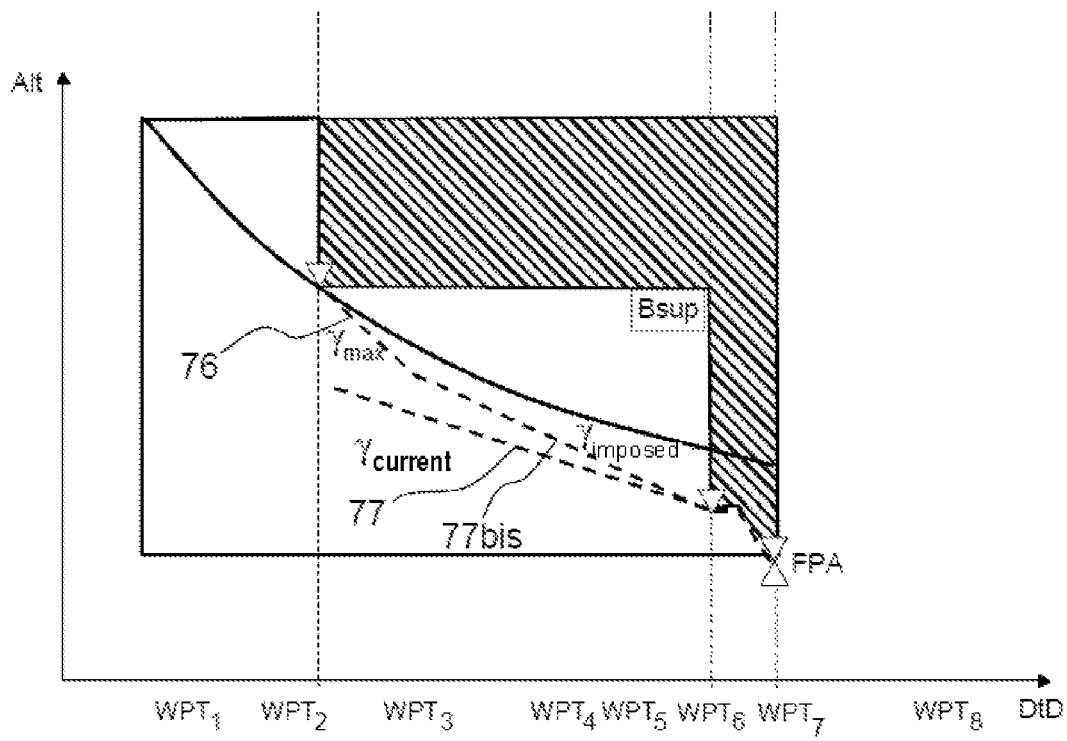

FIGS. 13a and 13b illustrate an exemplary "MAX IDLE length" trajectory computation. We have mentioned two scenarios in which the computation cannot find any modified IDLE trajectory making it possible to comply with a floor constraint:

When the attainable minimum slope is lower than the target slope but the length available for decelerating is smaller than the target length over which it is necessary to modify the trajectory; and when no possible junction point between the first segment 71 and the second segment 72 exists (case represented in FIG. 9f).

In this case, the computation replaces the segment 72 with a segment 72bis, carried out with slope $\gamma_{imposed}$, making it possible to join the segment 71 to the point 66, by means of a "fixed slope and imposed speed" mode imposing a non-reduced thrust. This is the case represented in FIG. 13a.

Figure 9G:
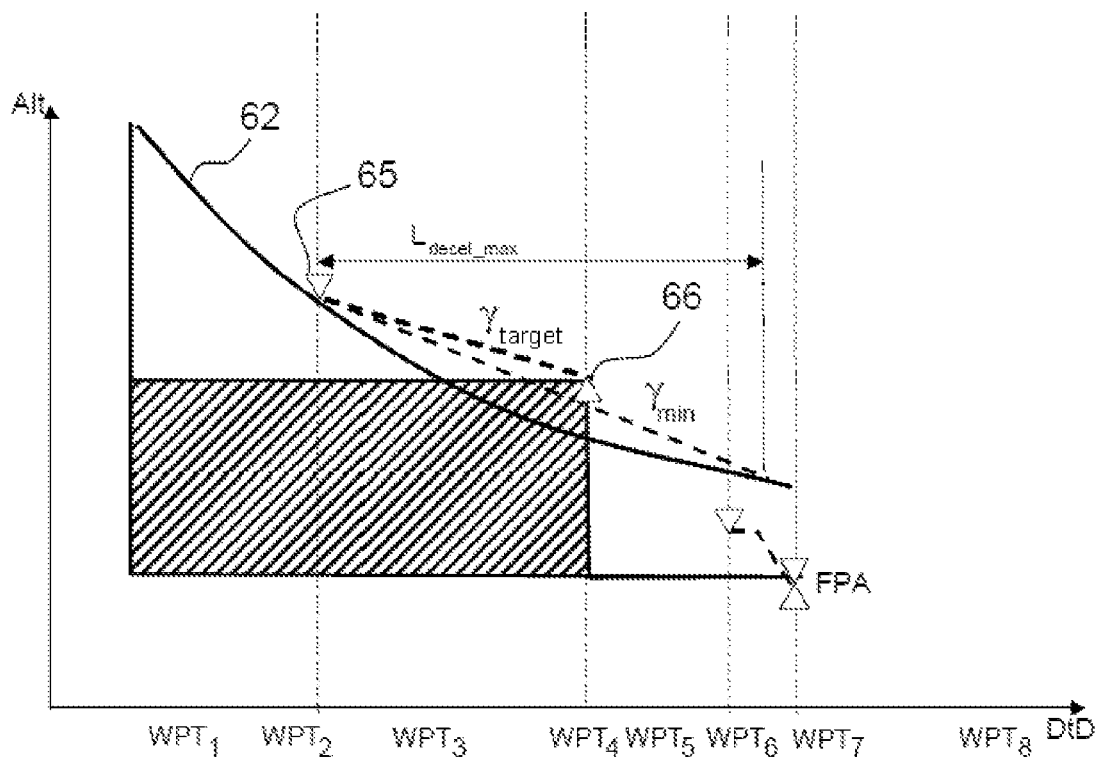

When even by decelerating (during IDLE), the resulting slope does not make it possible to maintain an altitude complying with the floor constraint (case represented in FIG. 9g).

In this case, the computation defines a trajectory comprising a segment of slope equal to the slope $\gamma_{target}$, making it possible to reach the point 66, by means of a "fixed slope and imposed speed" mode imposing a non-reduced thrust.

We have also mentioned two scenarios in which the computation cannot find any modified IDLE trajectory, with possible reacceleration, making it possible to comply with a ceiling constraint:

When the attainable maximum slope is higher than the target slope but the length available for accelerating is smaller than the target length over which it is necessary to modify the trajectory; and when no junction point between the two computed segments 76 and 77 exists (case represented in FIG. 10c).

In this case, the computation replaces the segment 77 with a segment 77bis carried out with slope $\gamma_{imposed}$, making it possible to join the segment 76 to the point 66, by means of a "fixed slope and imposed speed" mode imposing a non-reduced thrust. This is the case represented in FIG. 13b.

When even by accelerating (during IDLE), the resulting slope does not make it possible to maintain an altitude complying with the ceiling constraint.

In this case, the computation defines a trajectory comprising a segment of slope equal to the slope $\gamma_{target}$, making it possible to reach the point 66, by means of a "fixed slope and imposed speed" mode imposing a non-reduced thrust.

Stated otherwise, when the computation has exhausted the margin of acceleration or of deceleration making it possible to uphold the constraints of the cell, the "MAX IDLE length" computation mode permits pointwise exit from the IDLE mode so as to allow the aircraft to reach the following cell, in which the IDLE trajectory can be continued.

We have described three possible modes of computation of the vertical trajectory making it possible to optimize the length of the high-altitude IDLE segment, the length of the low-altitude IDLE segment, or the aggregate length of the IDLE segments. These three modes of computation are differentiated notably by the sequencing of the trajectory computation in the cells (commencing from the first cell, or by a backward computation, from the last cell), and by the options of the trajectory computation in a cell in the case where a complete IDLE trajectory in the cell cannot be found. These three modes of computation have on the other hand in common that they determine for at least one cell a vertical trajectory between the departure and arrival points complying with the altitude constraints of the cell and comprising the longest possible IDLE segment. According to case, the vertical trajectory optimizing the length of the IDLE segment can consist:

- solely of the unconstrained IDLE segment,
- of an IDLE segment modifying at least over a portion the speed of the aircraft, either by deceleration, or by acceleration when this option is permitted,
- of a succession of a first IDLE segment and of a second non-IDLE segment when the acceleration/deceleration margins are insufficient to carry out a complete IDLE segment in the cell.

Display of the Vertical Trajectory and Maneuvering Points

On completion of the vertical trajectory computation, according to one of the three possible computation modes, the method continues with a step 106 of computing and displaying the maneuvering points, making it possible, by modifications of the speed and/or of the aerodynamic configuration of the aircraft, to follow the vertical trajectory computed during one of steps 103, 104 or 105.

Figure 14:
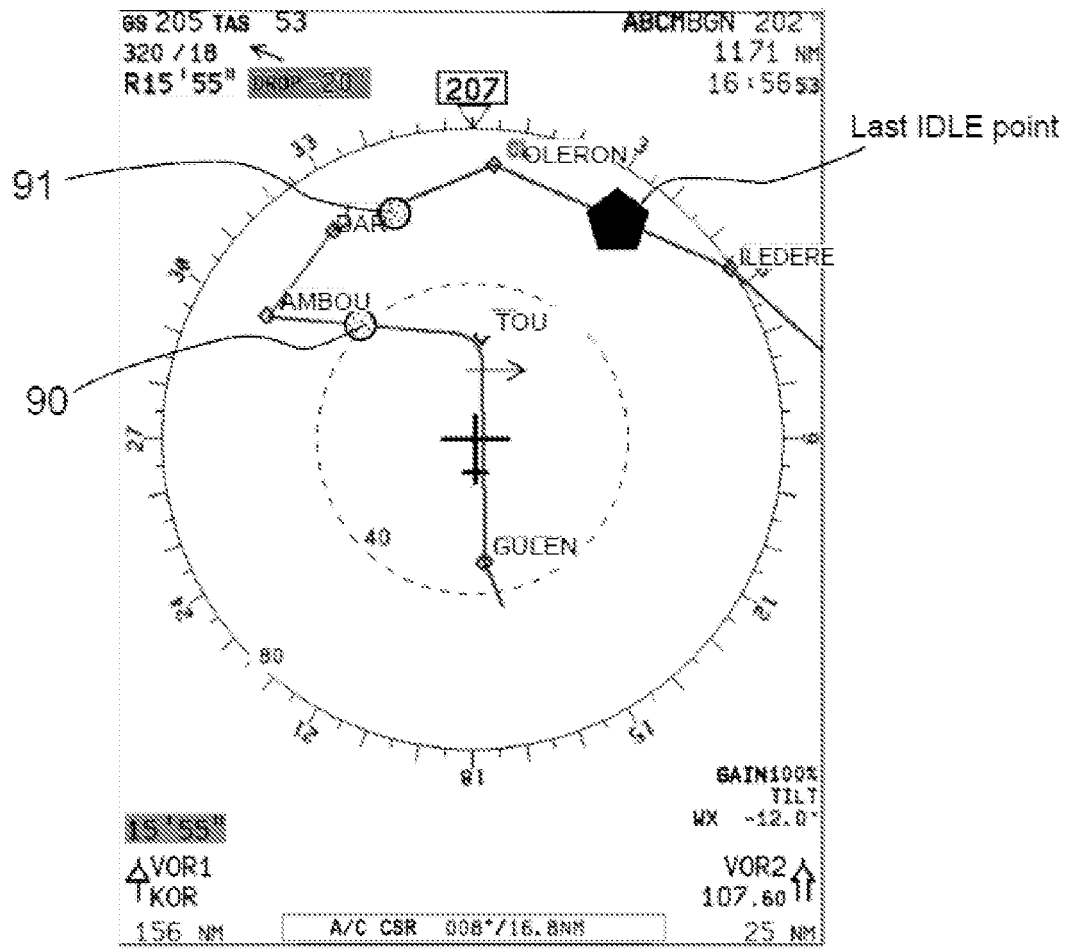
FIG. 14 illustrates an exemplary display of maneuvering points making it possible to maintain an IDLE trajectory computed by the method.

FIG. 14 illustrates an exemplary display, on a screen destined for the crew, of the maneuvering points making it possible along a descent and approach trajectory to maintain the IDLE vertical trajectory computed by the method. In the example represented, the vertical trajectory comprises two maneuvering points 90 and 91 making it possible to uphold an IDLE trajectory up to a point "Last IDLE point" demarcated on the screen by a pentagon.

The present invention also envisages the display of the vertical trajectory computed, in terms of altitude and speed, while also demarcating on this trajectory the necessary maneuvering points. It is further envisaged to put in place a visual and/or sound-based device making it possible to alert the crew according to an increasing periodicity which grows with the approach to a maneuvering point.

The invention also pertains to a flight management system comprising code instructions making it possible to perform the steps of the method for aiding navigation having the characteristics defined above. This new function can be integrated into an FMS system, to optimize a descent or approach procedure.

The invention claimed is:

1. A method for aiding a crew to navigate an aircraft to implement a flight management system between a computation start point ($WPT_{start}$) and a computation end point ($WPT_{end}$) during a descent and approach to a runway, the method comprising:
   collecting a data set comprising a flight plan comprising a succession of waypoints ($WPT_i$) between the computation start point ($WPT_{start}$) and the computation end point ($WPT_{end}$); vertical constraints ($CV_i$) being able to be associated with each waypoint ($WPT_i$);
   determining a corridor, between the computation start point ($WPT_{start}$) and the computation end point ($WPT_{end}$), comprising:
      a floor trajectory ($B_{inf}$) comprising a series of profiles defining a minimum altitude permitted to the aircraft, as a function of the vertical constraints ($CV_i$) of the succession of waypoints ($WPT_i$), and
      a ceiling trajectory ($B_{sup}$) comprising a series of profiles defining the maximum altitude permitted to the aircraft, as a function of the vertical constraints ($CV_i$) of the succession of waypoints ($WPT_i$);
   splitting the corridor into one or more cells ($CEL_j$) between the computation start point ($WPT_{start}$) and the computation end point ($WPT_{end}$); wherein each cell ($CEL_j$) being defined by a departure point ($Pd_j$) and an arrival point ($Pa_j$), the departure ($Pd_j$) and arrival ($Pa_j$) points being two waypoints ($WPT_i$) which are the furthest apart of the data set and which are between the ceiling trajectory ($B_{sup}$) and the floor trajectory ($B_{inf}$);
   determining for at least one cell ($CEL_j$) of a vertical trajectory between the departure ($Pd_j$) and arrival ($Pa_j$) points, complying with cell altitude constraints defined by the ceiling ($B_{sup}$) and floor ($B_{inf}$) trajectories, and comprising a longest possible IDLE segment;
   assembling a target vertical trajectory between the computation start point ($WPT_{start}$) and the computation end point ($WPT_{end}$), integrating the vertical trajectory of the at least one cell ($CEL_j$); and
   determining and displaying on a screen destined for the crew during the descent and approach to the runway maneuvering points of the aircraft to follow the target vertical trajectory.

2. The method according to claim 1, wherein the computation of the floor trajectory ($B_{inf}$) comprises:
   a first initialization step comprising defining a support point as the computation start point ($WPT_{start}$); and
   an iterative process, on the waypoints ($WPT_i$) of the data set, up to the computation end point ($WPT_{end}$), comprising:
      identifying the first waypoint ($WPT_i$) after the support point comprising a vertical constraint ($CV_i$) of at or above a given altitude,
      defining a floor profile of constant altitude equal to a value of the vertical constraint ($CV_i$) of the identified waypoint ($WPT_i$), between the support point and the identified waypoint ($WPT_i$), and
      defining the support point for the following iterative computation as the identified waypoint ($WPT_i$).

3. The method according to claim 2, wherein the iterative process of the floor ($B_{inf}$) or upper ($B_{sup}$) trajectory computation comprises steps comprising:
   identifying a waypoint ($WPT_i$) after the support point comprising a slope constraint of flight path angle (FPA), determining a descent point beyond which the aircraft must descend in order to attain the waypoint ($WPT_i$) while complying with the slope constraint, and defining a first profile of constant altitude between the support point and the descent point, followed by a second profile of decreasing altitude according to the slope constraint up to the waypoint ($WPT_i$).

4. The method according to claim 1, wherein the computation of the ceiling trajectory ($B_{sup}$) comprises:

a first initialization step comprising defining a support point as the computation start point ($WPT_{start}$); and an iterative process, on the waypoints ($WPT_i$) of the data set, up to the computation end point ($WPT_{end}$), comprising:

identifying the first waypoint ($WPT_i$) after the support point comprising a vertical constraint ($CV_i$) of at or above a given altitude, defining a ceiling profile of constant altitude equal to a value of the vertical constraint ($CV_i$) of the support point, between the support point and the identified waypoint ($CV_i$), and defining the support point for the following iterative computation to be the waypoint ($CV_i$).

5. The method according to claim 1, in which, for the floor ($B_{inf}$) or upper ($B_{sup}$) trajectory computation, any vertical constraint ($CV_i$) at a waypoint ($WPT_i$), which compels the aircraft to climb in altitude in order to comply with a vertical constraint ($CV_j$) at a following waypoint ($WPT_j$), is ignored.

6. The method according to claim 1, wherein the computation of the cells ($CEL_j$) comprises:

a first initialization step comprising defining the departure point ($Pd_j$) of a first cell ($CEL_1$) as the computation start point ($WPT_{start}$); and an iterative process, on the waypoints ($WPT_i$) of the data set, up to the computation end point ($WPT_{end}$), comprising:

identifying the first waypoint ($WPT_i$) after the departure point ($Pd_j$), belonging both to the floor trajectory ($B_{inf}$) and to the ceiling trajectory ($B_{sup}$), defining this waypoint ($WPT_i$) as the arrival point ($Pa_j$) of the cell ($CEL_j$), and identifying the first waypoint ($WPT_i$) on the basis of the arrival point ($Pa_j$), such that the floor trajectory ($B_{inf}$) is distinct from the ceiling trajectory ($B_{sup}$) after this waypoint ($WPT_i$), defining this waypoint ($WPT_i$) as the departure point ($Pd_{j+1}$) of the following cell ($CEL_{j+1}$).

7. The method according to claim 1, wherein the vertical trajectory computation is performed for the cell ($CEL_1$) whose departure point (Pd1) is the computation start point ($WPT_{start}$), and is then repeated in the following cells ($CEL_i$) as long as the longest possible IDLE segment of the vertical trajectory of the cell considered ($CEL_i$) to join the departure point ($Pd_i$) to the arrival point ($Pa_i$); the resulting target vertical trajectory (MAX IDLE high) defining the longest IDLE segment possible at high altitude.

8. The method according to claim 1, wherein the vertical trajectory computation is performed for the cell ($CEL_2$) whose arrival point ($Pa_2$) is the computation end point ($WPT_{end}$), and is then repeated in previous cells ($CEL_i$) as long as the longest possible IDLE segment of the vertical trajectory of the cell considered ($CEL_i$) makes it possible, by a backward computation, to join the arrival point ($Pa_i$) to the departure point ($Pd_i$); the resulting target vertical trajectory (MAX IDLE low) defining the longest IDLE segment possible at low altitude.

9. The method according to claim 1, wherein the vertical trajectory computation is performed in each of the cells ($CEL_i$); a resulting target vertical trajectory (MAX IDLE length) exhibiting a longest possible aggregate length of the IDLE segments of each of the cells ($CEL_i$).

10. The method according to claim 1, comprising a selection step to choose between one of three trajectory computation modes defined respectively by:

(i) wherein the vertical trajectory computation is performed for the cell ($CEL_1$) whose departure point (Pd1) is the computation start point ($WPT_{start}$), and is then repeated in the following cells ($CEL_i$) as long as the longest possible IDLE segment of the vertical trajectory of the cell considered ($CEL_i$) to join the departure point ($Pd_i$) to the arrival point ($Pa_i$); the resulting target vertical trajectory (MAX IDLE high) defining the longest longest IDLE segment at high altitude;

(ii) wherein the vertical trajectory computation is performed for the cell ($CEL_2$) whose arrival point ($Pa_2$) is the computation end point ($WPT_{end}$), and is then repeated in the previous cells ($CEL_i$) as long as the longest possible IDLE segment of the vertical trajectory of the cell considered ($CEL_i$), by a backward computation, to join the arrival point ($Pa_i$) to the departure point ($Pd_i$); the resulting target vertical trajectory (MAX IDLE low) defining the longest IDLE segment possible at low altitude; and (iii) wherein the vertical trajectory computation is performed in each of the cells ($CEL_i$); the resulting target vertical trajectory (MAX IDLE length) exhibiting a longest possible aggregate length of the IDLE segments of each of the cells ($CEL_i$).

11. The method according to claim 1, wherein the computation of vertical trajectory in a cell ($CEL_j$) comprises at least one of:

determining an unconstrained IDLE segment maintaining an aircraft speed constant between the departure point ($Pd_j$) and the arrival point ($Pa_j$), defining the vertical trajectory of the cell ($CEL_j$) as the unconstrained IDLE segment, when the unconstrained IDLE segment complies with the constraints ($B_{inf}$, $B_{sup}$) of the cell ($CEL_j$);

seeking whether there exists a modified IDLE segment to join the departure point ($Pd_j$) and the arrival point ($Pa_j$), by modifying the aircraft speed, when the unconstrained IDLE segment does not comply with the altitude constraints ($B_{inf}$, $B_{sup}$) of the cell ($CEL_j$), and determining the vertical trajectory of the cell ($CEL_j$) as the modified IDLE segment when it exists; and defining the vertical trajectory of the cell ($CEL_j$) as a succession of a first IDLE segment and of a second non-IDLE segment, when no IDLE trajectory complying with the altitude constraints ($B_{inf}$, $B_{sup}$) of the cell ($CEL_j$) can be found; a first IDLE segment corresponding to a portion of the unconstrained IDLE segment.

12. The method according to claim 11, wherein the computation of vertical trajectory in the cell ($CEL_1$) whose departure point ($Pd_1$) is the computation start point ($WPT_{start}$) comprises a step comprising, when the unconstrained IDLE segment does not comply with the altitude constraint defined by the floor trajectory ($B_{inf}$) of the cell ($CEL_j$), seeking whether there exists an unconstrained IDLE segment, initiated after the computation start point ($WPT_{start}$) complying with the constraints ($B_{inf}$, $B_{sup}$) of the cell ($CEL_j$).

13. The method according to claim 11, wherein the computation of vertical trajectory in a cell ($CEL_j$), when the unconstrained IDLE segment does not comply with the altitude constraint defined by the floor trajectory ($B_{inf}$) of the cell ($CEL_j$), comprises steps comprising:
  identifying a current waypoint and a target waypoint between which the unconstrained IDLE segment crosses the floor trajectory ($B_{inf}$),
  determining a target segment making it possible to join the current point to the target point while complying with the floor constraint ($B_{inf}$), along a target slope ($\gamma_{target}$); the current point and the target point being separated by a target length ($L_{target}$),
  determining a corrected IDLE segment on the basis of the current point, of constant minimum slope ($\gamma_{min}$), along which the aircraft speed is reduced down to a predefined threshold value, and according to a predefined deceleration value; the minimum slope ($\gamma_{min}$) being determined so as to maximize the length ($L_{decel\_max}$) of the corrected IDLE segment (67); and
  determining the vertical trajectory in the cell by comparing the target segment (64) with the corrected IDLE segment; the vertical trajectory between the current point and the target point being able to comprise at least one of:
    an IDLE segment of slope equal to the minimum slope ($\gamma_{min}$), and a second IDLE segment carried out at constant speed; and
    an IDLE segment of slope and of length equal to the corrected IDLE segment followed by a non-IDLE segment.

14. The method according to claim 11, wherein the computation of vertical trajectory in a cell ($CEL_j$), when the unconstrained IDLE segment does not comply with the altitude constraint defined by the ceiling trajectory ($B_{sup}$) of the cell ($CEL_j$), comprises steps comprising:
  identifying a current waypoint and a target waypoint between which the unconstrained IDLE segment crosses the ceiling trajectory ($B_{sup}$),
  determining a target segment to join the current point to the target point while complying with the ceiling constraint ($B_{sup}$), along a target slope ($\gamma_{target}$); the current point and the target point being separated by a target length ($L_{target}$);
  determining a corrected IDLE segment on the basis of the current point, of constant maximum slope ($\gamma_{max}$), along which the aircraft speed is increased up to a predefined threshold value, and according to a predefined acceleration value; the minimum slope ($\gamma_{max}$) being determined so as to maximize the length ($L_{accel\_max}$) of the corrected IDLE segment; and
  determining the vertical trajectory by comparing the target segment with the corrected IDLE segment; the vertical trajectory between the current point and the target point being able to comprise at least one of:
    an IDLE segment of slope equal to the maximum slope ($\gamma_{max}$), and a second IDLE segment carried out at constant speed; and
    an IDLE segment of slope and of length equal to the corrected IDLE segment followed by a non-IDLE segment.

15. A flight management system comprising non-transitory code instructions to perform a method for aiding a crew to navigate an aircraft to implement a flight management system between a computation start point ($WPT_{start}$) and a computation end point ($WPT_{end}$) during a descent and a roach to a runway, the method comprising:
  collecting a data set comprising a flight plan comprising a succession of waypoints ($WPT_i$) between the computation start point ($WPT_{start}$) and the computation end point ($WPT_{end}$); vertical constraints ($CV_i$) being able to be associated with each waypoint ($WPT_i$);
  determining a corridor, between the computation start point ($WPT_{start}$) and the computation end point ($WPT_{end}$), comprising:
    a floor trajectory ($B_{inf}$) comprising a series of profiles defining a minimum altitude permitted to the aircraft as a function of the vertical constraints ($CV_i$) of the succession of waypoints ($WPT_i$), and
    a ceiling trajectory ($B_{sup}$) consisting of a series of profiles defining the maximum altitude permitted to the aircraft, as a function of the vertical constraints ($CV_i$) of the succession of waypoints ($WPT_i$);
  slitting the corridor into one or more cells ($CEL_j$) between the computation start point ($WPT_{start}$) and the computation end point ($WPT_{end}$); wherein each cell ($CEL_j$) being defined by a departure point ($Pd_j$) and an arrival point ($Pa_j$), the departure ($Pd_j$) and arrival ($Pa_j$) points being two waypoints ($WPT_i$) which are the furthest apart of the data set and which are between the ceiling trajectory ($B_{sup}$) and the floor trajectory ($B_{inf}$);
  determining for at least one cell ($CEL_j$) of a vertical trajectory between the departure ($Pd_j$) and arrival ($Pa_j$) points, complying with cell altitude constraints defined by the ceiling ($B_{sup}$) and floor ($B_{inf}$) trajectories, and comprising a longest possible IDLE segment;
  assembling a target vertical trajectory between the computation start point ($WPT_{start}$) and the computation end point ($WPT_{end}$), integrating the vertical trajectory of the at least one cell ($CEL_j$); and
  determining and displaying on a screen destined for the crew during the descent and approach to the runway maneuvering points of the aircraft to follow the target vertical trajectory.

* * * * *

UNITED STATES PATENT AND TRADEMARK OFFICE
CERTIFICATE OF CORRECTION

PATENT NO. : 9,188,978 B2  
APPLICATION NO. : 14/522469  
DATED : November 17, 2015  
INVENTOR(S) : Jerome Sacle et al.

Page 1 of 1

It is certified that error appears in the above-identified patent and that said Letters Patent is hereby corrected as shown below:

In the claims:

Column 30, in line 5 of claim 15, "descent and a roach" should be --descent and approach--.

Signed and Sealed this  
Twenty-second Day of March, 2016

Michelle K. Lee  
*Director of the United States Patent and Trademark Office*